(12) United States Patent
Norimatsu et al.

(10) Patent No.: US 8,969,757 B2
(45) Date of Patent: Mar. 3, 2015

(54) RELIEF MANUFACTURING APPARATUS AND RELIEF MANUFACTURING METHOD

(75) Inventors: Masashi Norimatsu, Ashigarakami-gun (JP); Ichirou Miyagawa, Ashigarakami-gun (JP); Osamu Shimazaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1052 days.

(21) Appl. No.: 13/028,828

(22) Filed: Feb. 16, 2011

(65) Prior Publication Data

US 2011/0198325 A1    Aug. 18, 2011

(30) Foreign Application Priority Data

Feb. 17, 2010    (JP) .................................. 2010-032586

(51) Int. Cl.
   *B23K 26/00*    (2014.01)
   *B23K 26/38*    (2014.01)
   *B23K 26/08*    (2014.01)
   *B41C 1/05*     (2006.01)

(52) U.S. Cl.
   CPC ............. *B23K 26/38* (2013.01); *B23K 26/0823* (2013.01); *B41C 1/05* (2013.01)
   USPC ................................. 219/121.67; 219/121.72

(58) Field of Classification Search
   CPC ....... B23K 26/0823; B23K 26/38; B41C 1/05
   USPC ............. 219/121.61, 121.62, 121.67, 121.69, 219/121.72, 121.76, 121.82; 101/150, 395, 101/401.1
   See application file for complete search history.

(56) References Cited

U.S. PATENT DOCUMENTS

| 6,150,629 | A  | * | 11/2000 | Sievers ................... 219/121.62 |
| 6,811,858 | B1 | * | 11/2004 | Mayer et al. ............... 428/195.1 |
| 6,857,365 | B2 |   | 2/2005  | Juffinger et al. |
| 7,800,638 | B2 | * | 9/2010  | Ogawa .......................... 347/224 |
| 7,827,912 | B2 | * | 11/2010 | Siman-Tov et al. ......... 101/401.1 |
| 8,673,428 | B2 | * | 3/2014  | Naoyuki et al. .............. 428/172 |
| 2002/0195012 | A1 | * | 12/2002 | Juffinger et al. ........... 101/401.1 |
| 2004/0025728 | A1 | * | 2/2004 | Adamczyk .................... 101/395 |
| 2004/0047587 | A1 | * | 3/2004 | Osborne ....................... 385/147 |
| 2005/0193909 | A1 | * | 9/2005 | Mayer et al. .................. 101/395 |
| 2007/0041024 | A1 | * | 2/2007 | Gao et al. ...................... 356/616 |

FOREIGN PATENT DOCUMENTS

JP    2003-334674 A    11/2003
JP        3556204 B2     8/2004

* cited by examiner

*Primary Examiner* — Thien S Tran
(74) *Attorney, Agent, or Firm* — Sughrue Mion, PLLC

(57) ABSTRACT

A relief manufacturing apparatus includes: a laser beam irradiating device configured to irradiate laser beam on an engraving material; a scanning device configured to move at least one of the engraving material and the laser beam irradiating device; a numerical value acquiring device configured to acquire a numerical value including a first inclination angle indicating inclination of the inclined face of the relief; a control device configured to control the scanning device and the laser beam irradiating device so that the laser beam is irradiated on a surface of the engraving material to form an initial inclined face having a second inclination angle smaller than the first inclination angle and thereafter the laser beam is irradiated on the initial inclined face to enlarge the inclination of the inclined face from the second inclination angle to the first inclination angle.

18 Claims, 18 Drawing Sheets

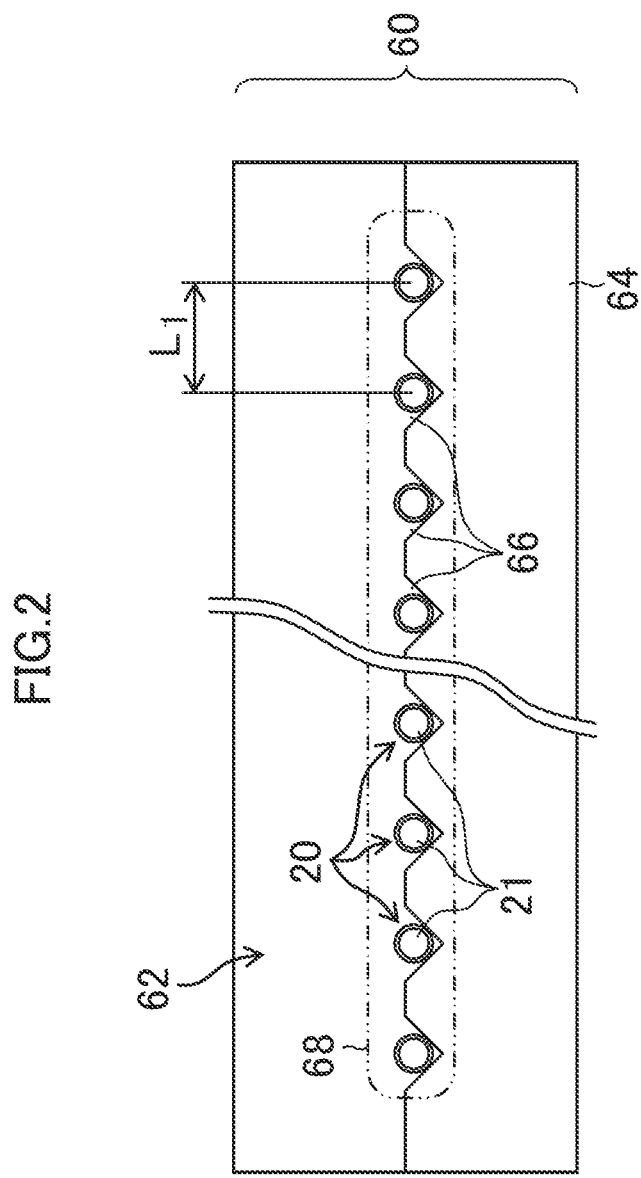

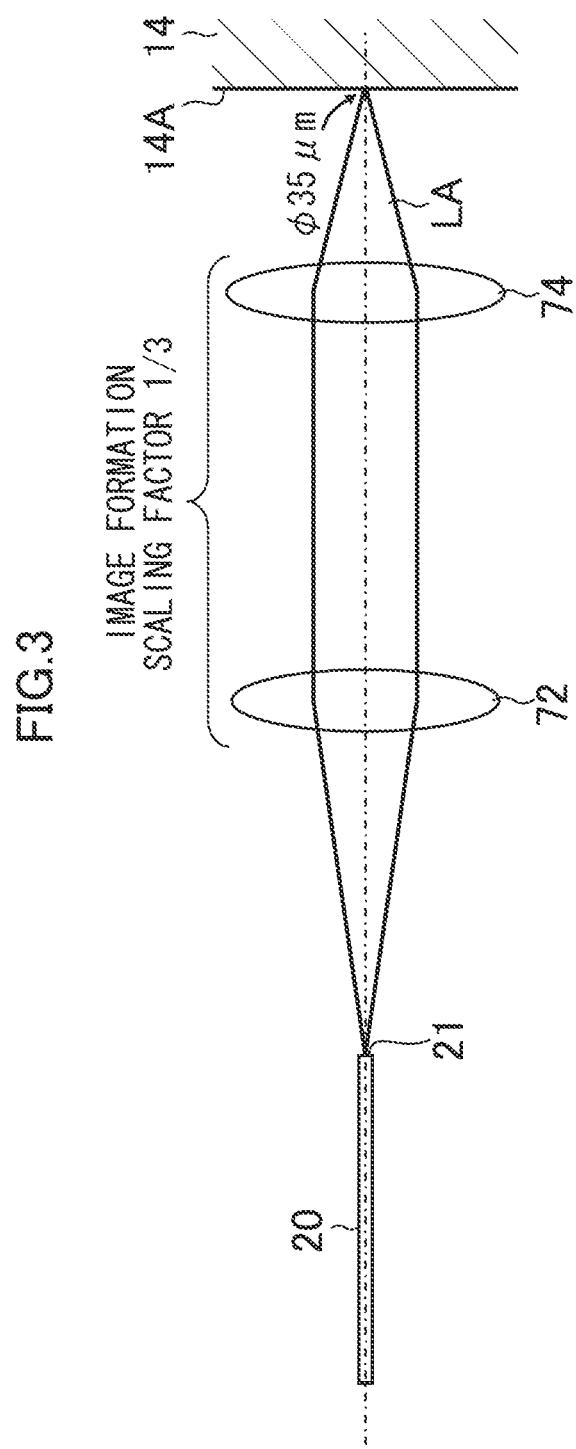

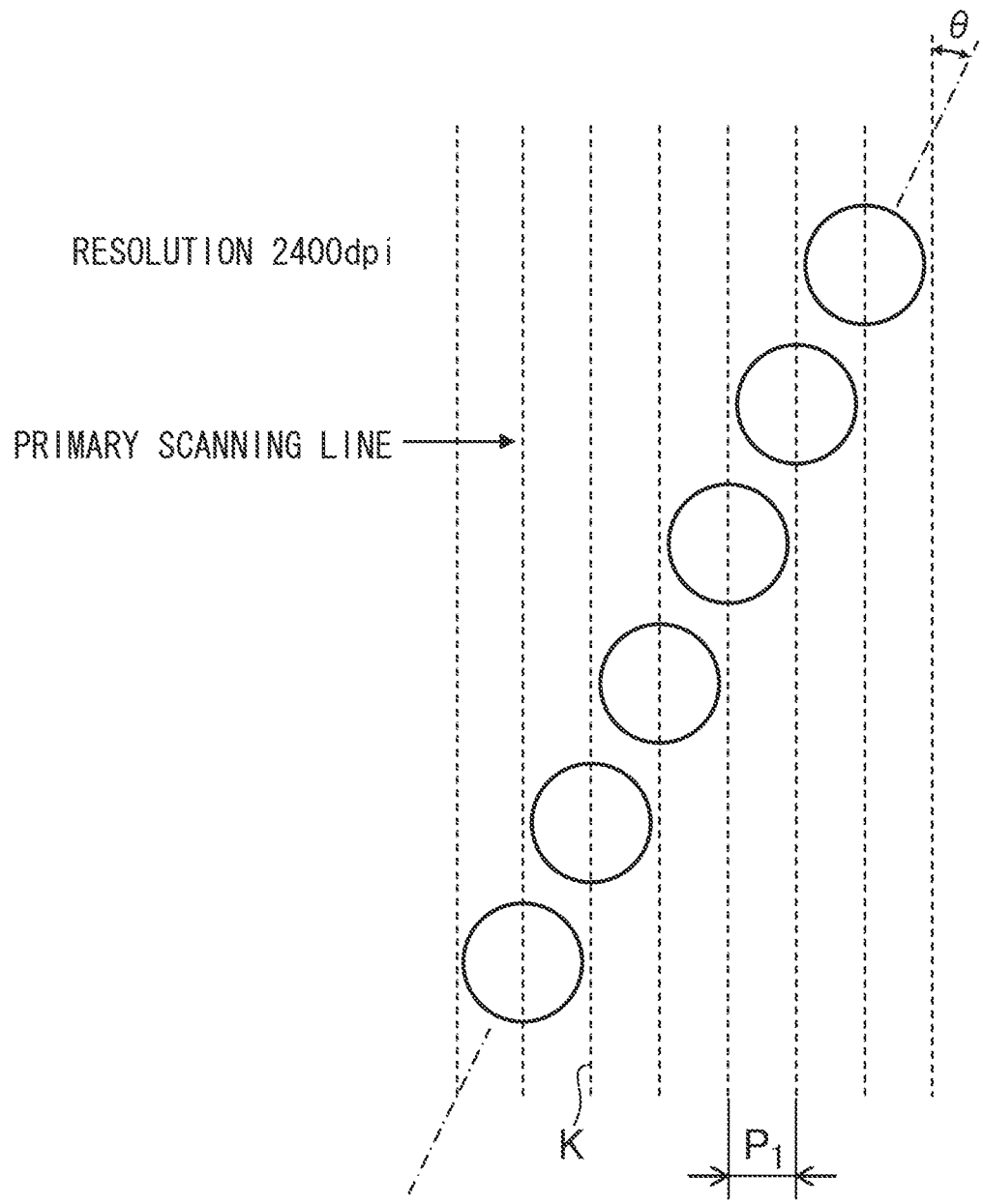

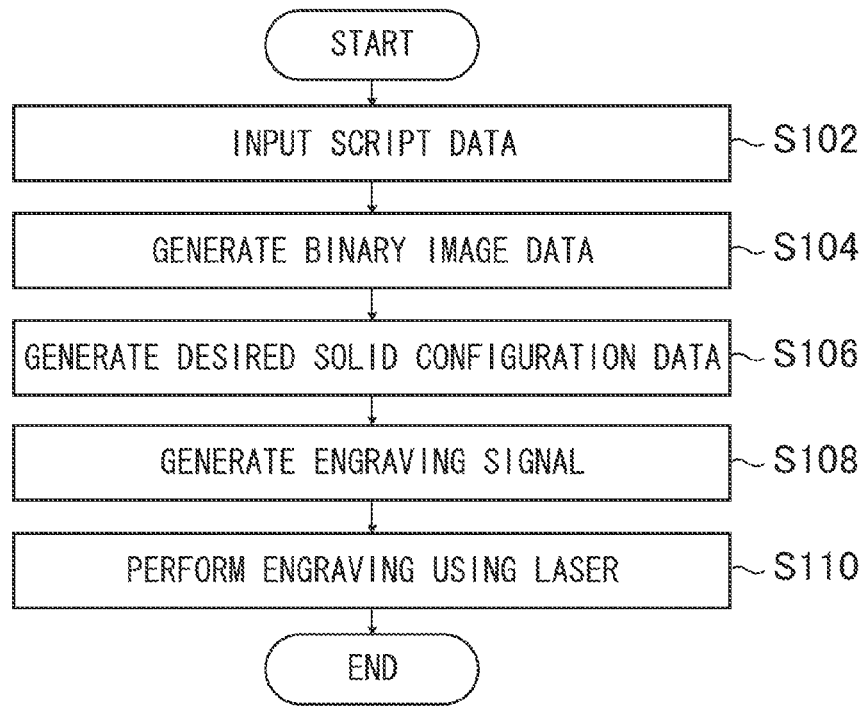
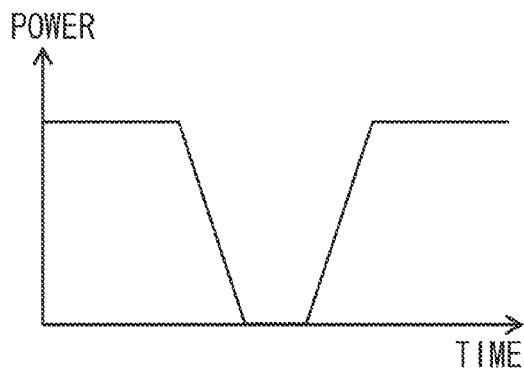
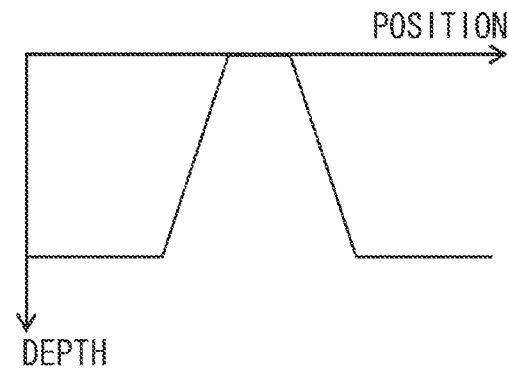

FIG.14
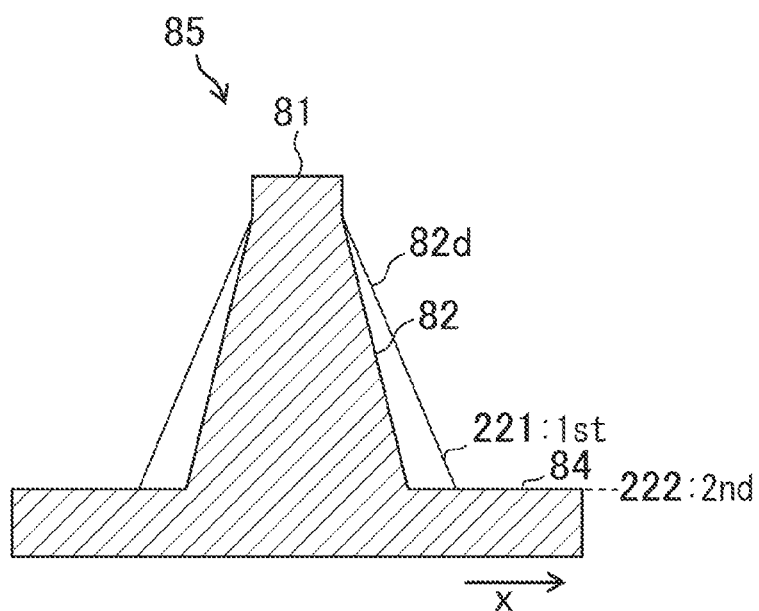
FIG.15A
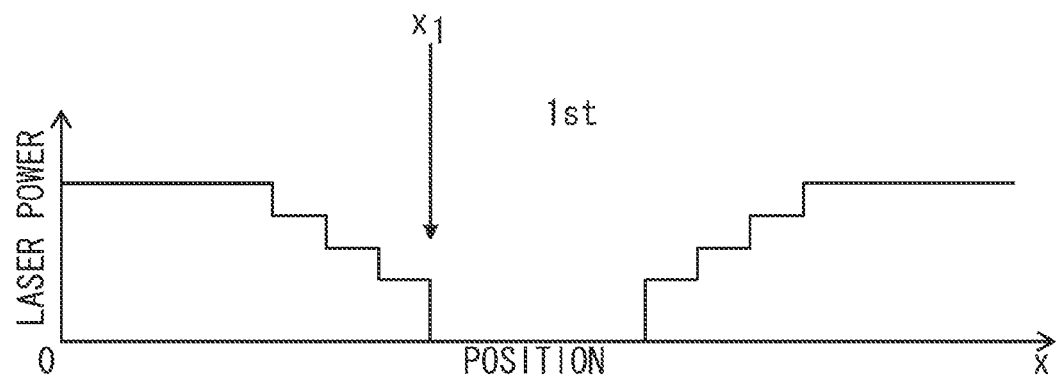
FIG.15B

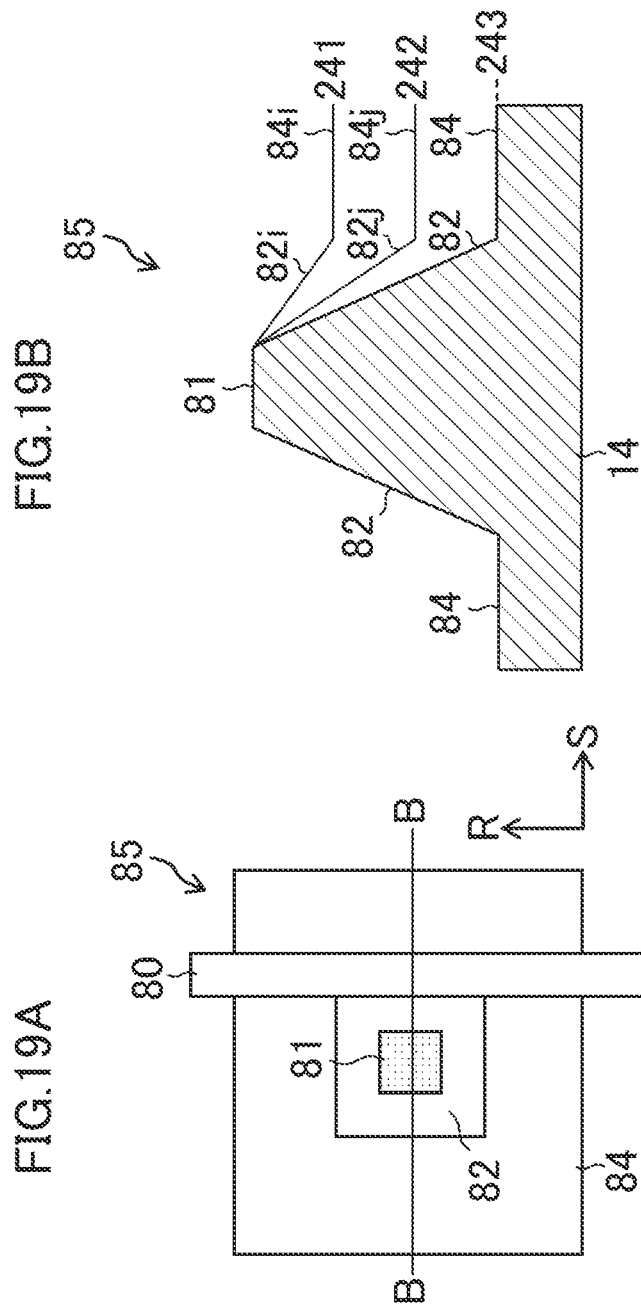

FIRST TIME

SECOND TIME

RELIEF MANUFACTURING APPARATUS AND RELIEF MANUFACTURING METHOD

BACKGROUND OF THE INVENTION

1. Field of the Invention

The presently disclosed subject matter relates to relief manufacturing apparatuses and relief manufacturing methods which perform engraving using a laser beam to manufacture a relief, and more particularly to a relief manufacturing apparatus and a relief manufacturing method which can easily form a microscopic and steep inclined face.

2. Description of the Related Art

A method is known in which engraving is performed by irradiating a laser beam on the surface of an engraving material to manufacture a relief having a concave and convex relief pattern; while a top face (for example, halftone dot) used as a printing area remains unchanged, an area surrounding the top face is removed by the irradiating laser beam, whereby a printing plate is manufactured.

Japanese Patent No. 3556204 discloses a method which performs on/off switching of the laser beam to repeatedly irradiate the laser beam plural times on the identical area of the material surface so that a deep concave portion is formed.

Japanese Patent Application Laid-Open No. 2003-334674 discloses a laser processing method which irradiates, through a mask having a light shielding section and a transparent section, a laser beam of a given pattern on a resist film formed on the principal surface of a processed object. In this method, a plurality of masks having the light shielding films of a gradually enlarged width are used, and the laser beam is repeatedly irradiated on the resist film (thin-film), so that a staircase-shaped slope is formed.

SUMMARY OF THE INVENTION

When a steep inclined face is formed by a single laser beam irradiation, a significantly great laser beam power must be used; in this case, there may arise a problem that an area which should remain unchanged is thermally affected and removed. More specifically, as illustrated in FIG. 26A, when the power of a laser beam 90 is raised, an edge 93 and the like neighboring an inclined face 92 of a top face 91 (printing area) is melted and removed by thermal effects. This problem is especially remarkable when the desired width of the top face 91 is small. For example, as illustrated in FIG. 26B, the top face 91 may be wholly melted.

Using the techniques described in Japanese Patent No. 3556204 and Japanese Patent Application Laid-Open No. 2003-334674, it is possible to lower the power of the laser beam 90 for each irradiation when a staircase-shaped relief pattern 95 is formed by irradiating the laser beam 90 plural times. However, when it is required to smoothen the staircase-shaped slope, the number of steps of the staircase must be enlarged and at the same time, the variation in light shielding width for each exposure must be minimized. Accordingly, it is practically not easy to form a microscopic inclined face having a great inclination angle.

The presently disclosed subject matter has been devised in view of these circumstances and has an object to provide a relief manufacturing apparatus and a relief manufacturing method which, in performing engraving using a laser beam to form a relief pattern having a top face and an inclined face, can easily form a microscopic and steep inclined face.

To achieve the object, the presently disclosed subject matter provides a relief manufacturing apparatus capable of engraving an engraving material using a laser beam and thereby manufacturing a relief having a top face and an inclined face. The relief manufacturing apparatus includes: a laser beam irradiating device which irradiates a laser beam on the engraving material; a scanning device which moves at least one of the engraving material and the laser beam irradiating device and thereby causes the laser beam irradiating device to scan the engraving material; a numerical value acquiring device which acquires a numerical value indicating a solid configuration of the relief, the value including a first inclination angle indicating the inclination of the inclined face of the relief; a control device which controls the scanning device and the laser beam irradiating device so that the laser beam is irradiated on a surface of the engraving material to form an initial inclined face having a second inclination angle smaller than the first inclination angle acquired by the numerical value acquiring device and thereafter the laser beam is irradiated on the initial inclined face to enlarge the inclination of the inclined face from the second inclination angle to the first inclination angle.

In this way, after forming of the initial inclined face having a smaller inclination angle by irradiating the laser beam, control is performed to steepen the inclined face. Accordingly, a microscopic and steep inclined face can easily be formed. That is, when the desired inclination angle of the inclined face is great, the conventional technique forming the desired inclined face by a single scanning requires a significantly great laser beam power; thus, part of or all of a top face which should remain unchanged may be removed by thermal effects. According to the presently disclosed subject matter, however, the forming of the initial inclined face having a small inclination angle and the steepening of the inclined face are separately performed; thus, when a microscopic engraving is needed, also, the inclined face having a great inclination angle can easily be formed while ensuring that the necessary top face remains unchanged. According to the conventional technique forming the inclined face of a staircase shape through on/off switching of a laser beam, the number of steps of the staircase must be enlarged to smoothen the inclination of the staircase-shaped inclined face. According to the presently disclosed subject matter, however, control is performed so that the inclination angle of the inclined face is enlarged. Thus, the microscopic and steep inclined face can easily be formed while the number of times of laser beam irradiation is not enlarged so much.

According to an aspect of the presently disclosed subject matter, when a first inclined face and a second inclined face are formed which incline towards the outside of the top face while having the top face therebetween, the numerical value acquiring device acquires a width of the top face of the relief, and the control device performs switching between the following two operations based on the width acquired by the numerical value acquiring device: that is, an operation of irradiating a laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

In this way, depending on the width of the desired top face, of the two inclined faces inclining towards the outside of the top face while having the top face therebetween, firstly, one of the initial inclined faces may be formed by a single scanning and thereafter the other initial inclined face may be formed by a single scanning. Accordingly, the inclined face (especially, edge portion) is suppressed from being degraded by interaction between heat applied to the one inclined face and heat applied to the other inclined face.

According to an aspect of the presently disclosed subject matter, the control device irradiates a laser beam by a single scanning on both the first initial inclined face and the second initial inclined face and thereby enlarges the inclination of the first initial inclined face and the inclination of the second initial inclined face from the second inclination angle to the first inclination angle.

In this way, both the first inclined face and the second inclined face are steepened by a single scanning and thus the inclined face can be quickly steepened to the desired inclination angle.

According to an aspect of the presently disclosed subject matter, the numerical value acquiring device acquires a first depth corresponding to a bottom face between the inclined faces of the relief, and the control device forms the initial inclined faces and at the same time, forms an initial bottom face of a second depth smaller than the first depth between the initial inclined faces, and thereafter enlarges the inclination of the initial inclined faces from the second inclination angle to the first inclination angle and at the same time, enlarges the depth of the initial bottom face from the second depth to the first depth.

According to an aspect of the presently disclosed subject matter, the numerical value acquiring device acquires a depth of the bottom face between the inclined faces of the relief, and the control device forms the initial inclined faces and at the same time, forms the bottom face of the depth between the initial inclined faces, and thereafter enlarges the inclination of the initial inclined faces from the second inclination angle to the first inclination angle.

In this way, in enlarging the inclination angle, the bottom face is not engraved and thus the accuracy of the inclined face is securely prevented from being degraded by heat of the laser beam irradiated on the bottom face.

Further, the presently disclosed subject matter provides a relief manufacturing apparatus capable of engraving an engraving material using a laser beam and thereby manufacturing a relief having a top face and an inclined face. The relief manufacturing apparatus includes: a laser beam irradiating device which irradiates the laser beam on the engraving material; a scanning device which moves at least one of the engraving material and the laser beam irradiating device and thereby causes the laser beam irradiating device to scan the engraving material; a numerical value acquiring device which acquires a numerical value indicating a solid configuration of the relief, the value including a width of the top face of the relief; and a control device which controls the scanning device and the laser beam irradiating device; and when a first inclined face and a second inclined face are formed which incline towards the outside of the top face while having the top face therebetween, the control device performs switching between the following two operations based on the width of the top face acquired by the numerical value acquiring device: that is, an operation of irradiating a laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

In this way, depending on the width of the desired top face, of the two inclined faces inclining towards the outside of the top face while having the top face therebetween, firstly, one of the inclined faces may be formed by a single scanning and thereafter the other inclined face may be formed by a single scanning. Accordingly, the inclined face (especially, edge portion) is suppressed from being degraded by interaction between heat applied to the one inclined face and heat applied to the other inclined face.

According to an aspect of the presently disclosed subject matter, the laser beam irradiating device includes a plurality of laser beam irradiation openings arrayed in a scanning direction, and the control device switches the number of times of simultaneous laser beam irradiation on the same scanning line.

According to an aspect of the presently disclosed subject matter, the laser beam irradiating device includes a plurality of laser beam irradiation openings arrayed in a first scanning direction and in a second scanning direction orthogonal to the first scanning direction; and the control device switches the number of times of simultaneous laser beam irradiation on the same scanning line both in the first scanning direction and in the second scanning direction.

According to an aspect of the presently disclosed subject matter, the control device switches the number of times of simultaneous laser beam irradiation on the same scanning line, and also switches the magnitude of power of the simultaneously irradiated laser beams.

The presently disclosed subject matter provides a relief manufacturing method which engraves an engraving material using a laser beam and thereby manufactures a relief having a top face and an inclined face. The relief manufacturing method uses: a laser beam irradiating device which irradiates a laser beam on the engraving material; a scanning device which moves at least one of the engraving material and the laser beam irradiating device and thereby causes the laser beam irradiating device to scan the engraving material; and a numerical value acquiring device which acquires a numerical value indicating a solid configuration of the relief. The relief manufacturing method includes: a numerical value acquiring step of acquiring a first inclination angle indicating the inclination of the inclined face of the relief by use of the numerical value acquiring device; an inclined face forming step of irradiating the laser beam on a surface of the engraving material by use of the laser beam irradiating device and the scanning device and thereby forming an initial inclined face having a second inclination angle smaller than the first inclination angle; and an inclined face steepening step of irradiating the laser beam on the initial inclined face by use of the laser beam irradiating device and the scanning device and thereby enlarging the inclination of the inclined face from the second inclination angle to the first inclination angle.

According to an aspect of the presently disclosed subject matter, when a first inclined face and a second inclined face are formed which incline towards the outside of the top face while having the top face therebetween: in the numerical value acquiring step, a width of the top face of the relief is acquired; and in the inclined face forming step, switching is performed based on the width acquired in the numerical value acquiring step between the following two operations: that is, an operation of irradiating a laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

According to an aspect of the presently disclosed subject matter, in the inclined face steepening step, the laser beam is irradiated by a single scanning both on the first initial inclined face and the second initial inclined face to enlarge the inclination of both the first initial inclined face and the second initial inclined face from the second inclination angle to the first inclination angle.

According to an aspect of the presently disclosed subject matter, in the numerical value acquiring step, a first depth corresponding to a bottom face between the inclined faces of the relief is acquired, and in the inclined face forming step, the initial inclined face is formed and at the same time, an initial bottom face of a second depth smaller than the first depth is formed between the initial inclined faces and thereafter, in the inclined face steepening step, the inclination of the initial inclined face is enlarged from the second inclination angle to the first inclination angle and at the same time, the depth of the initial bottom face is enlarged from the second depth to the first depth.

According to an aspect of the presently disclosed subject matter, in the numerical value acquiring step, a depth of the bottom face between the inclined faces of the relief is acquired, and in the inclined face forming step, the initial inclined face is formed and at the same time, a bottom face of the depth is formed between the initial inclined faces and thereafter, in the inclined face steepening step, the inclination of the initial inclined face is enlarged from the second inclination angle to the first inclination angle.

The presently disclosed subject matter provides a relief manufacturing method which engraves an engraving material using a laser beam and thereby manufactures a relief having a top face and having a first inclined face and a second inclined face inclining towards the outside of the top face while having the top face therebetween. The relief manufacturing method uses: a laser beam irradiating device which irradiates the laser beam on the engraving material; a scanning device which moves at least one of the engraving material and the laser beam irradiating device and thereby causes the laser beam irradiating device to scan the engraving material; and a numerical value acquiring device which acquires a numerical value indicating a solid configuration of the relief. The relief manufacturing method includes: a numerical value acquiring step of acquiring a width of the top face of the relief by use of the numerical value acquiring device; a determination step of determining based on the acquired width which one of the following two operations is to be performed: that is, an operation of irradiating a laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed; and an engraving step of engraving the engraving material based on the determination result of the determination step by use of the laser beam irradiating device and the scanning device.

According to an aspect of the presently disclosed subject matter, the laser beam irradiating device includes a plurality of laser beam irradiation openings arrayed in a scanning direction, and the number of times of simultaneous laser beam irradiation on the same scanning line is switched.

According to an aspect of the presently disclosed subject matter, the laser beam irradiating device includes a plurality of laser beam irradiation openings arrayed in a first scanning direction and in a second scanning direction orthogonal to the first scanning direction, and the number of times of simultaneous laser beam irradiation on the same scanning line both in the first scanning direction and in the second scanning direction is switched.

According to an aspect of the presently disclosed subject matter, control is performed so that the number of times of simultaneous laser beam irradiation on the same scanning line is switched, and the magnitude of power of the simultaneously irradiated laser beams is switched.

According to the presently disclosed subject matter, a microscopic and steep inclined face can easily be formed.

BRIEF DESCRIPTION OF THE DRAWINGS

FIG. 2 is a substantial enlarged view of an optical fiber array unit arranged in an exposure head;

FIG. 3 is a schematic view of an image formation optical system of the optical fiber array unit;

FIG. 4 is an explanatory view illustrating the relationship between exemplary arrangement of optical fibers and scanning lines in the optical fiber array unit;

FIG. 5 is a schematic flowchart illustrating a basic procedure of an exemplary process of manufacturing a printing plate;

FIG. 6A is a view illustrating an exemplary laser beam control signal; and FIG. 6B is a view illustrating the relationship between the position and the depth of engraving when engraving is performed by the laser beam control signal;

FIG. 14 is a cross-sectional view for explaining exemplary second exposure control according to the first embodiment;

FIGS. 15A and 15B are views illustrating a laser beam control signal in the exemplary second exposure control according to the first embodiment;

FIG. 19A is a plan view illustrating an exemplary relief pattern having a point-like top face; and FIG. 19B is a cross-sectional view for explaining exemplary exposure control according to a third embodiment;

DETAILED DESCRIPTION OF THE PREFERRED EMBODIMENTS

Embodiments of the presently disclosed subject matter will be described in detail below with reference to the accompanying drawings.

First, an exemplary configuration of a relief manufacturing apparatus will be described.

Figure 1:
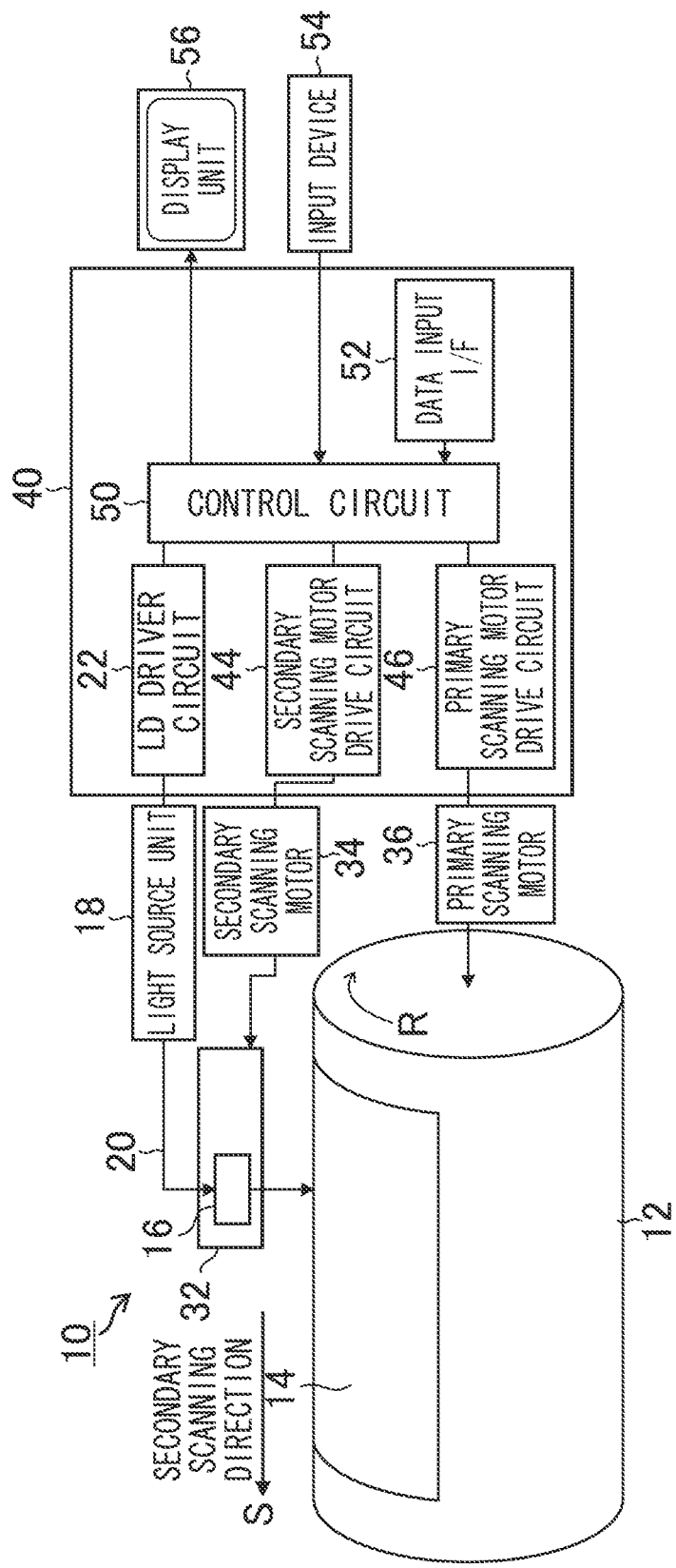
FIG. 1 is a basic configuration diagram of a plate manufacturing apparatus being an exemplary relief manufacturing apparatus according to the presently disclosed subject matter.

FIG. 1 is a view illustrating a basic configuration of a plate manufacturing apparatus 10 being an exemplary relief manufacturing apparatus according to the presently disclosed subject matter. The plate manufacturing apparatus 10 engraves a plate material 14 (engraving material) by use of a laser beam and thereby manufactures a printing plate which is a relief. For example, a rubber plate or a plastic plate for flexography is manufactured. In this example, a printing plate is manufactured which includes a top face used as a printing area, an inclined face neighboring the top face, and a bottom face between the inclined faces.

In the plate manufacturing apparatus 10 of FIG. 1, the sheet-like plate material 14 is secured (fixed) to an outer circumferential surface of a cylinder 12 (rotation body); and the cylinder 12 is rotated in a direction of arrow R (primary scanning direction) so that the plate material 14 moves in the primary scanning direction R. That is, an exposure head 16 performs primary scanning on the plate material 14. The exposure head 16 can move in a direction of arrow S (secondary scanning direction) orthogonal to the primary scanning direction R. That is, the exposure head 16 performs secondary scanning on the plate material 14.

In this way, in this example, the exposure head 16 can perform two-dimensional scanning (primary scanning and secondary scanning) on the plate material 14. The exposure head 16 performs scanning and irradiates a laser beam on the plate material 14, so that a given image is engraved (recorded) on the surface of the plate material 14.

In this example, the exposure head 16 is a multibeam head capable of simultaneously irradiating a plurality of laser beams generated by a light source unit 18. A detailed configuration of the light source unit 18 is not illustrated here. The light source unit 18 includes a plurality of semiconductor laser units (laser diodes, not illustrated). Light from the semiconductor laser units is transmitted via separate optical fibers 20 to the exposure head 16. In this example, a broad area semiconductor laser unit (for example, wavelength: 915 nm) is used as the semiconductor laser unit. The semiconductor laser units are connected via separate lines to corresponding LD (Laser Diode) driver circuits 22; the semiconductor laser units are separately driven by the LD driver circuits 22. For example, a semiconductor laser unit may be used which has a core diameter of 105 μm and a maximum output of 10 W.

The exposure head 16 is mounted on a carriage 32 capable of moving in the secondary scanning direction S. The motion mechanism of the carriage 32 is not illustrated in detail here. A well-known device such as a combination of a ball screw and translation rail may be used as the motion mechanism of the carriage 32. When a secondary scanning motor 34 which rotationally drives the ball screw is operated, the carriage 32 on the ball screw is moved in the secondary scanning direction S while being guided by the translation rail. When a primary scanning motor 36 is operated, the cylinder 12 with the plate material 14 secured thereon can be rotationally driven.

A control unit 40 includes, in addition to the LD driver 22, a secondary scanning motor drive circuit 44 which drives the secondary scanning motor 34, a primary scanning motor drive circuit 46 which drives the primary scanning motor 36, a control circuit 50, a data input interface unit 52, an input device 54 used as a user interface, and a display unit 56.

The control circuit 50 includes a central processing unit (CPU) and its peripheral circuits. The control circuit 50 functions as a control device which controls the units of the plate manufacturing apparatus 10 according to a program, and also functions as an arithmetic device which performs various types of calculations.

As the data input interface unit 52, various types of communication interfaces, cabled or wireless, may be used including USB (Universal Serial Bus), IEEE1394, Ethernet (registered trademark) and Bluetooth (registered trademark). Alternatively, a media interface may be used which captures data from external storage media such as a memory card, magnetic disk and optical disk.

Script image data indicating an image to be engraved (recorded) on the plate material 14 is supplied via the data input interface unit 52 to the control circuit 50. The control circuit 50 controls, based on this input image data, driving of the scanning motors (34, 36) of the scanning system and at the same time, performs the output control (the on/off control and the power control of the laser beam) of each of the semiconductor laser units of the light source unit 18. The device for controlling the output of the laser beam is not limited to the aspect of controlling the emission amount of the semiconductor laser units; instead of this aspect or in combination of this aspect, an optical modulation device such as an acoustic optical modulator (AOM) may be used.

The exposure head 16 of FIG. 1 constitutes a laser beam irradiating device which irradiates a laser beam on the plate material 14. The secondary scanning motor 34, the primary scanning motor 36, the secondary scanning motor drive circuit 44 and the primary scanning motor drive circuit 46 of FIG. 1 constitutes a scanning device which causes the laser beam irradiating device to scan the plate material 14.

FIG. 2 is an enlarged view of a light emitting section of an optical fiber array unit 60 arranged in the exposure head 16. In a light emitting section 62 of the optical fiber array unit 60, as illustrated in FIG. 2, optical fibers 20 of a core diameter of 105 μm which emit multiple rays of light (for example, 32 rays) at regular intervals are arrayed on a linear line. In the embodiment of the presently disclosed subject matter, the number of the optical fibers 20 is particularly not limited. Further, multibeam is not always needed; an aspect of performing engraving by a single beam may also be implemented. The optical fiber array unit 60 includes a pedestal (V-shaped groove substrate) 64. On one side of the pedestal 64, V-shaped grooves 66 of the same number (in this example, 32) as the number of the semiconductor laser units in the light source unit 18 (refer to FIG. 1) are formed at a given interval in a manner neighboring each other (refer to FIG. 2). Ends 21 (referred to below as an irradiation opening) of the optical fibers 20 are fit one by one into the respective V-shaped grooves 66 of the pedestal 64. This constitutes a group of irradiation openings 68 arrayed on a linear line. A plurality of laser beams from the group of irradiation openings 68 can be simultaneously irradiated on the plate material 14.

FIG. 3 is a schematic view of an image formation system of the optical fiber array unit 60. In the exposure head 16, as illustrated in FIG. 3, a collimator lens 72 and an image formation lens 74 are arranged. An image formation device (image formation optical system) constituted of a combination of these lenses (72, 74) allows the light emitting section 62 of the optical fiber array unit 60 illustrated in FIG. 2 to focus light on an exposure surface (front surface) 14A and its vicinities of the plate material 14 at a given image formation scaling factor (refer to FIG. 3). In the present embodiment, the image formation scaling factor is ⅓; thus, the spot diameter of a laser beam LA irradiated from the irradiation opening 21 of a diameter of 105 μm is Φ 35 μm. In the exposure head 16 having this image formation system, when the interval (L1 in FIG. 2) between the neighboring fibers of the optical fiber array unit 60 illustrated in FIG. 2 and the inclination angle (angle θ in FIG. 4) of an array direction of the group of irradiation openings 68 when the optical fiber array unit 60 is secured to the exposure head 16 are appropriately designed, interval P1 of scanning lines (primary scanning lines) K exposed by the laser beam emitted from the optical fibers arrayed in a manner neighboring each other can be set to 10.58 μm (corresponding to a resolution of 2400 dpi in a secondary scanning direction) as illustrated in FIG. 4.

While the primary scanning motor 36 illustrated in FIG. 1 is driven to rotate the cylinder 12 at a given speed, laser beams of 32 channels, for example, from the exposure head 16 are irradiated on the plate material 14 on the cylinder 12 according to image data, so that an exposure range corresponding to 32 channels (corresponding to one swath) is exposed to perform engraving (image recording) corresponding to one swath on the surface of the plate material 14.

By the rotation of the cylinder 12, for example, when the exposure head 16 passes a non-recording area (for example, when the exposure head 16 passes a chuck section used for holding the plate material 14), the secondary scanning motor 34 is driven to intermittently move the exposure head 16 in a direction of axis line of the cylinder 12 (in a secondary scanning direction), so that the subsequent range corresponding to one swath is exposed. In this way, when multibeam scanning by the intermittent movement in a secondary scanning direction is repeated, the desired image is formed on the whole surface of the plate material 14.

The presently disclosed subject matter is not limited to an aspect of performing noninterlaced exposure in which all the pixels in one swath are exposed all at once instead of leaving a space between the pixels during beam scanning; an aspect of performing interlaced exposure may also be implemented which leaves a space corresponding to one or more pixels in a secondary scanning direction. In this example, the plate material 14 having a shape of sheet is used, but a cylindrical recording medium (sleeve type) may also be used.

A process of manufacturing a printing plate which is an exemplary relief (referred to below as a printing plate process) will be described.

FIG. 5 is a schematic flowchart illustrating a basic procedure of an exemplary printing plate process. This process is executed based on control by the control circuit 50 of FIG. 1 according to a program.

As illustrated in FIG. 5, script data is inputted through the data input interface (52 of FIG. 1) (step S102). Then, the control circuit 50 converts the script data into binary image data (dot data) by use of RIP (Raster Image Processor) process (step S104). Subsequently, the control circuit 50 generates, based on the script data and the binary image data, desired solid configuration data indicating the desired solid configuration (that is, the solid configuration of a relief to be manufactured) (step S106).

For example, in forming a relief pattern 85 of a convex shape illustrated in FIGS. 16A and 16B described later, in the desired-solid configuration data generation (step S106), the control circuit 50 acquires numerical values indicating the desired solid configuration, including width Tw of a top face 81 (halftone dots), the inclination angle of inclined faces 82e and 82f, and the depth of a bottom face 84. For example, of the plate material (14 of FIG. 1), in an area (referred to below as a low resolution engraving area) corresponding to a low resolution part (for example, a character part) of the script data, the width of the top face 81 is set greater and the inclination angle of inclined faces 82e and 82f is set smaller to perform high-speed engraving. But, in an area (referred to below as a high resolution engraving area) corresponding to a high resolution part (for example, a picture part) of the script data, the width of the top face 81 is set smaller and the inclination angle of inclined faces 82e and 82f is set greater than the low resolution engraving area. Further, for example, of the plate material 14, in an area where halftone dots (the top face 81) are thickly provided, the depth of the bottom face 84 is set smaller; and in an area where halftone dots are not thickly provided, the depth of the bottom face 84 is set greater. In this example, the control circuit 50 calculates numerical values indicating the desired solid configuration. But, the presently disclosed subject matter is not particularly limited thereto; the numerical values indicating the desired solid configuration may be acquired using a well-known method. For example, the numerical values may be directly inputted through the input device 54, or the numerical values may be read from a memory (not illustrated). Alternatively, a method may be used by which a part of the numerical values is acquired from the input device 54 or the memory and the other numerical values are calculated by the control circuit 50.

Subsequently, the control circuit 50 generates, based on the desired solid configuration data, an engraving signal used to perform engraving using a laser beam (step S108). The engraving signal includes: a drive signal (a scanning control signal), supplied to the secondary scanning motor drive circuit 44 and the primary scanning motor drive circuit 46, used for relative movement between the irradiation opening 21 of the exposure head 16 and the engraving area of the plate material 14; and a drive signal (a laser beam control signal), supplied to the LD driver circuit 22, used for laser beam irradiation from the exposure head 16 to the plate material 14.

When beam scanning and laser beam irradiation are performed based on the engraving signal, engraving (laser engraving) using the laser beam is performed (step S110). More specifically, the scanning control signal from the control circuit 50 is supplied to the secondary scanning motor drive circuit 44 and the primary scanning motor drive circuit 46, and the laser beam control signal from the control circuit 50 is supplied to the LD driver circuit 22.

FIG. 6A illustrates an exemplary laser beam control signal. FIG. 6B illustrates the relationship between the position and the depth of engraving when engraving is performed based on the laser beam control signal by a single scanning at a given scanning speed. In this way, the LD driver circuit 22 regulates, based on the laser beam control signal supplied from the control circuit 50, the power of laser beam generated by the semiconductor laser unit of the light source unit 18 and emitted from the irradiation opening 21 of the exposure head 16. When a given scanning speed is used, as the power of the laser beam increases, the depth of engraving becomes greater.

The presently disclosed subject matter will be described below with reference to various embodiments.

First, a first embodiment of the presently disclosed subject matter will be described.

Figure 7:
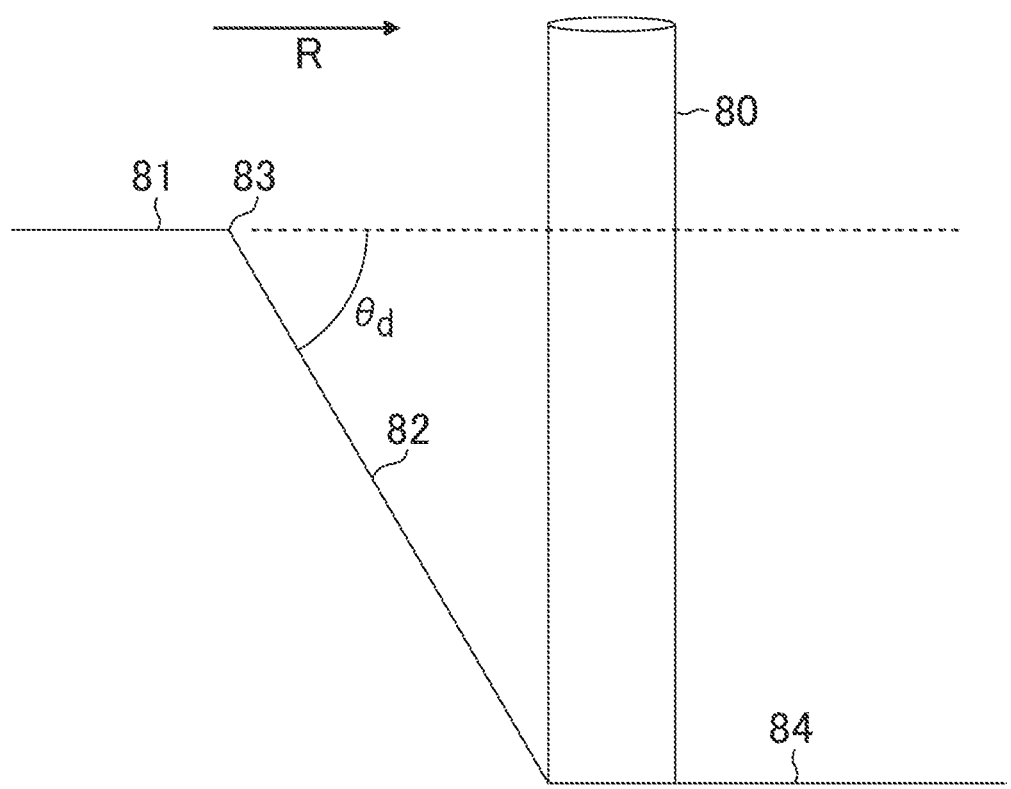
FIG. 7 is a view for explaining the basic principle of engraving by laser beam.

FIG. 7 is a view for explaining the basic principle of engraving by laser beam. This view illustrates a case in which an inclined face 82 having a desired inclination angle θd is formed using a single laser beam 80 by a single beam scanning. In a case in which the desired inclination angle θd is small, that is, in a case in which a gradually inclined face 82 is formed, when the inclined face 82 is formed by a single beam scanning, also, an edge 83 (ridge section) neighboring the inclined face 82 of a top face 81 can be accurately formed.

Figure 8:
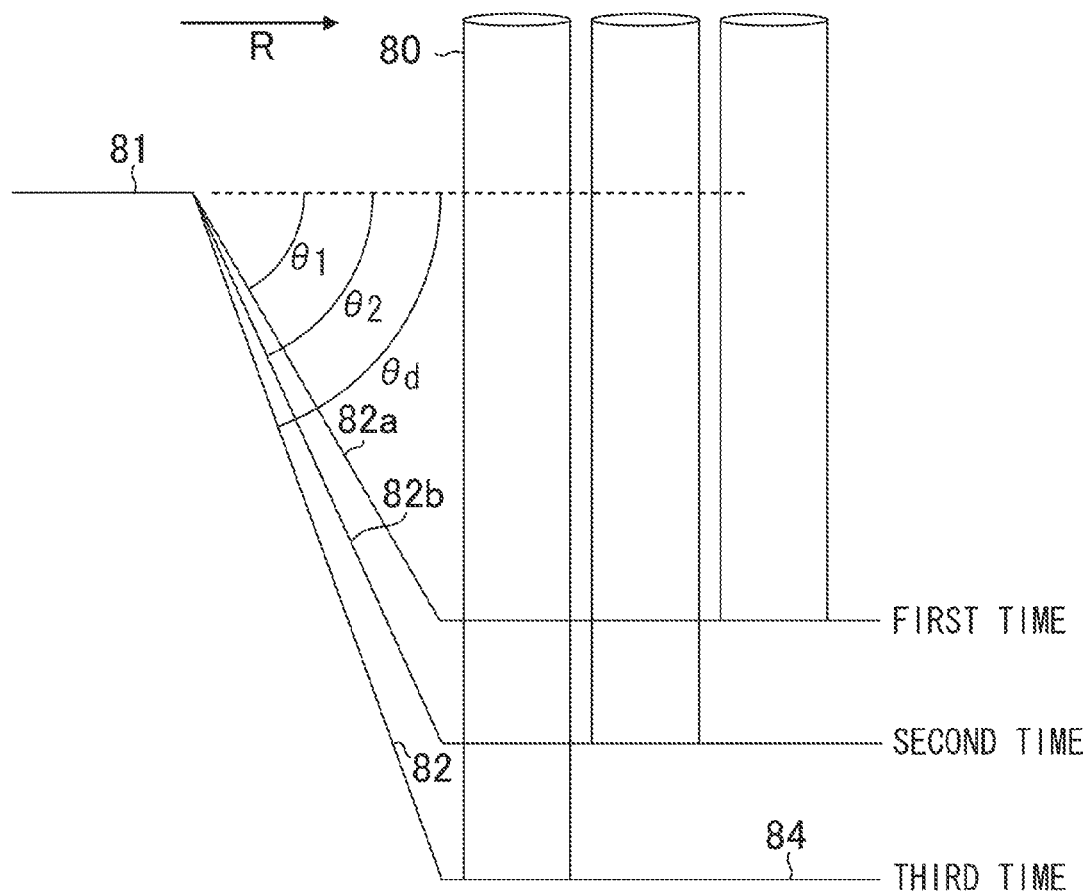
FIG. 8 is an explanatory view illustrating a process of engraving by use of a single laser beam.

In a case in which the desired inclination angle θd is great, that is, in a case in which a steep inclined face 82 is formed, the inclined face 82 having the desired inclination angle θd is, as illustrated in FIG. 8, formed by multiple beam scannings (in this example, three scannings).

More specifically, the control circuit 50 acquires the desired inclination angle θd and compares the acquired inclination angle θd with a threshold value. When θd is equal to or smaller than the threshold value, the inclined face 82 is, as illustrated in FIG. 7, formed by a single beam scanning; and when θd is greater than the threshold value, the inclined face 82 is, as illustrated in FIG. 8, formed by multiple beam scannings.

Figure 9:
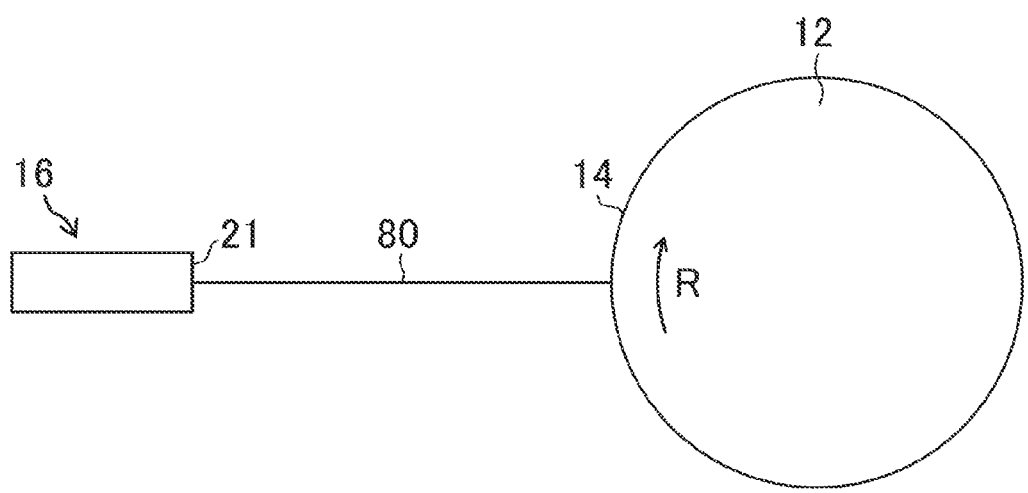
FIG. 9 is an explanatory view illustrating the basic principle of engraving in which an inclined face is steepened by plural-time exposure processes.

For example, as illustrated in FIG. 9, the cylinder 12 is rotated and an inclined face formation area of a plate material 14 on the outer circumferential surface of the cylinder 12 is scanned three times through the irradiation opening 21 of the exposure head 16, so that laser beam irradiation (exposure) is performed by a single laser beam 80 for each beam scanning. That is, laser beam irradiation is performed three times on the same inclined face formation area of the plate material 14. More specifically, in the first beam scanning, an initial inclined face 82a having an inclination angle θ1 is formed, in the second beam scanning, the inclination angle is enlarged to θ2 (>θ1) to form an intermediate inclined face 82b, and in the third beam scanning, the inclination angle is enlarged to θd (>θ2) to form the desired inclined face 82.

Figure 10:
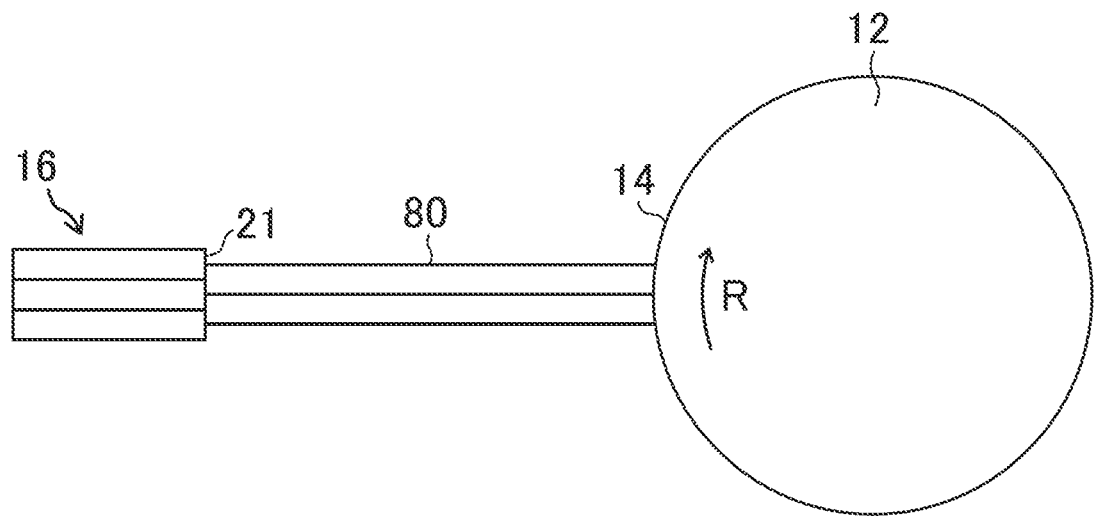
FIG. 10 is an explanatory view illustrating a process of engraving by use of multiple laser beams.

As illustrated in FIG. 10, the laser beam 80 may be irradiated through a plurality of irradiation openings 21 arrayed in a primary scanning direction R, that is, a plurality of the laser beams 80 arrayed in a primary scanning direction R may be used to perform laser beam irradiation (exposure) plural times on the same inclined face formation area of the plate material 14. In this case, while the cylinder 12 is rotated once, exposure is performed using a plurality of the laser beams 80, so that multiple beam scannings are performed.

In this specification, the "multiple beam scannings" is particularly not limited to the case in which the same irradiation opening 21 of the exposure head 16 moves (scans) plural times facing a specific engraving area (for example, a specific inclined face formation area) on the plate material 14 (engraving material). When a multibeam exposure head including a plurality of irradiation openings 21 is used, different irradiation openings 21 of the exposure head 16 may move (scan) plural times in total facing the same engraving area on the plate material 14 (engraving material), which is also the "multiple beam scannings".

In this specification, when scanning is performed on the same scanning line in the same direction, a case is also referred to as the "single beam scanning", in which a laser beam from a given irradiation opening 21 is irradiated on a specific engraving area (for example, a specific inclined face formation area) of the plate material 14 and then the laser beam is turned off, and thereafter the laser beam from the same irradiation opening 21 is irradiated on another engraving area (for example, another inclined face formation area) of the plate material 14.

For example, in the case of a single beam, when the cylinder 12 goes into a 360-degree roll, the irradiation opening 21 moves once in a primary scanning direction, that is, the primary scanning is performed once. Also, in the case of a single beam, when the exposure head 16 moves once in a secondary scanning direction, the irradiation opening 21 moves once in a secondary scanning direction, that is, the secondary scanning is performed once. In the case of a multibeam, also, when the number of the irradiation openings 21 moves facing one engraving area (for example, one inclined face formation area) is one, the scanning is performed once.

Figure 11A:
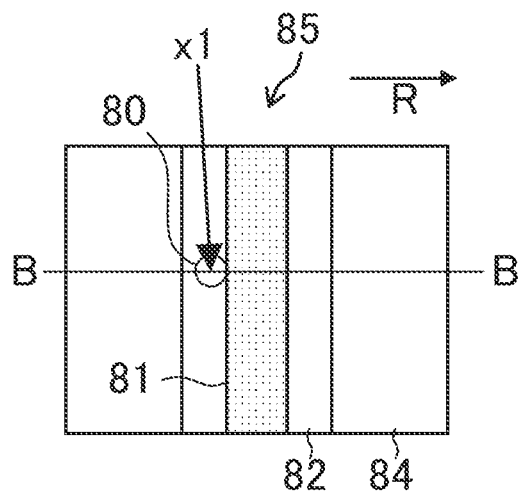
FIG. 11A is a plan view illustrating an exemplary print block having a band-like top face.
Figure 11B:
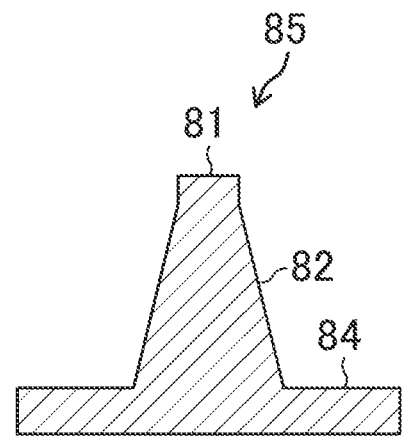
FIG. 11B is a cross-sectional view of the print block along the line B-B of FIG. 11A.

FIG. 11A is a plan view illustrating an exemplary relief pattern 85 having a band-like top face 81. FIG. 11B is a cross-sectional view of the relief pattern 85 along the line B-B in a primary scanning direction R of FIG. 11A.

First, a first example of exposure control for forming the relief pattern 85 illustrated in FIGS. 11A and 11B will be described with reference to an explanatory view of FIG. 12 and a view illustrating a laser beam control signal pattern illustrated in FIGS. 13A to 13C.

Figure 12:
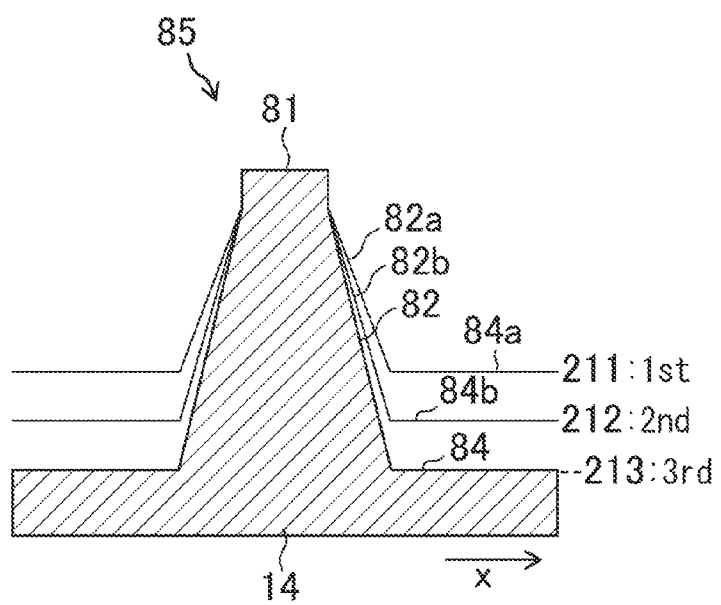
FIG. 12 is a cross-sectional view for explaining exemplary first exposure control according to a first embodiment.

Referring to FIG. 12, reference numeral 211 designates a surface of the plate material 14 after a first beam scanning; reference numeral 212 designates a surface of the plate material 14 after a second beam scanning; and reference numeral 213 designates a surface of the plate material 14 after a third beam scanning.

Figure 13A:
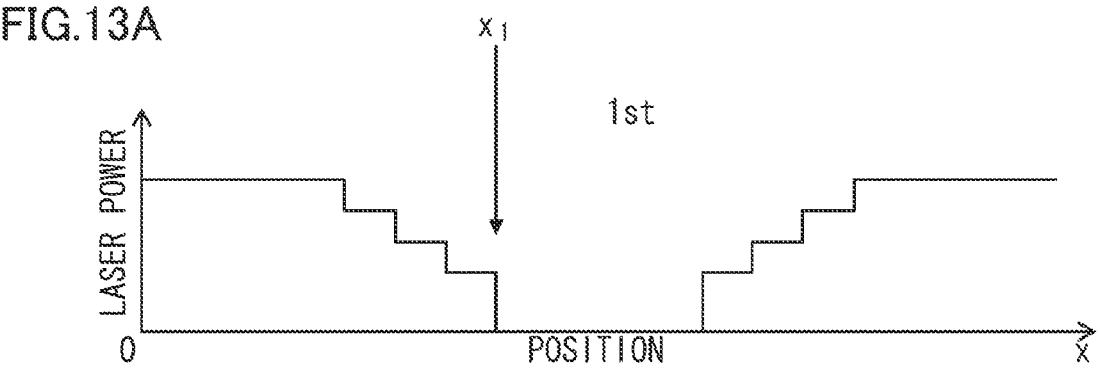
FIGS. 13A to 13C are views illustrating a laser beam control signal in the exemplary first exposure control according to the first embodiment.
Figure 13B:
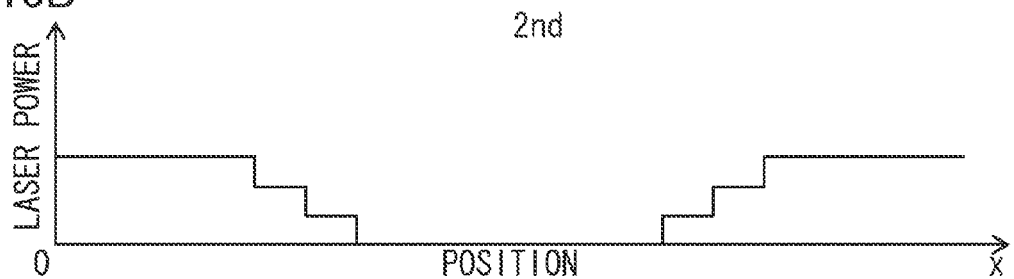
Figure 13C:
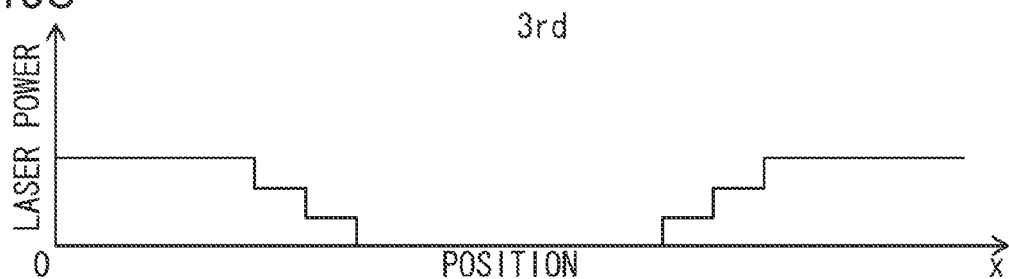

The control circuit 50 of this example supplies to the LD driver circuit 22 a laser beam control signal illustrated in FIG. 13A at a first beam scanning, and supplies to the LD driver circuit 22 a laser beam control signal illustrated in FIG. 13B at a second beam scanning, and supplies to the LD driver circuit 22 a laser beam control signal illustrated in FIG. 13C at a third beam scanning.

Here, the beam scanning is performed along the line B-B of FIG. 11A. When the laser beam 80 comes into contact with a formation area of the top face 81 of the relief pattern 85 for the first time, the central position of the laser beam 80 is x1 (refer to FIG. 11A. That is, when the diameter of the laser beam 80 is considered, the laser beam must be turned off forward of the top face 81 formation area.

In this example, firstly, a first beam scanning is performed to form an initial inclined face 82*a* and an initial bottom face 84*a*. Subsequently, a second beam scanning is performed to enlarge the inclination angle of the initial inclined face 82*a* and the depth of the initial bottom face 84*a*, so that an intermediate inclined face 82*b* and an intermediate bottom face 84*b* are formed. Subsequently, a third beam scanning is performed to enlarge the inclination angle of the intermediate inclined face 82*b* and the depth of the intermediate bottom face 84*b*, so that the desired inclined face 82 and the desired bottom face 84 are formed.

More specifically, the control circuit (50 of FIG. 1) of this example acquires as the numerical values indicating the desired solid configuration, at least the width (desired width) of the top face 81, the inclination angle (desired inclination angle) of the inclined face 82 and the depth (desired depth) of the bottom face 84, and generates based on the numerical values an engraving signal (a scanning control signal and a laser beam control signal). In the first beam scanning, the initial inclined face 82*a* having an inclination angle smaller than the desired inclination angle acquired is formed and at the same time, the initial bottom face 84*a* having a depth smaller than the desired depth acquired is formed between the initial inclined faces 82*a*. Thereafter, by multiple (or a single) beam scannings, the inclination angle of the initial inclined face 82*a* is controlled to be gradually enlarged to the desired inclination angle and at the same time, the depth of the initial bottom face 84*a* is gradually enlarged to the desired depth.

A second example of exposure control for forming the relief pattern 85 illustrated in FIGS. 11A and 11B will be described with reference to an explanatory view of FIG. 14 and a view illustrating a laser beam control signal pattern illustrated in FIGS. 15A and 15B.

Referring to FIG. 14, reference numeral 221 designates a surface of the plate material 14 after a first beam scanning; and reference numeral 222 designates a surface of the plate material 14 after a second beam scanning.

The control circuit 50 of this example supplies to the LD driver circuit 22 a laser beam control signal illustrated in FIG. 15A at a first beam scanning, and supplies to the LD driver circuit 22 a laser beam control signal illustrated in FIG. 15B at a second beam scanning.

In this example, firstly, a first beam scanning is performed to form an initial inclined face 82*d* and the desired bottom face 84. Subsequently, a second beam scanning is performed to enlarge the inclination angle of the initial inclined face 82*d*, so that the desired inclined face 82 is formed. Accordingly, when the required depth is greater, also, the initial inclined face having a smaller inclination angle and the required depth are provided by the first beam scanning; thus only the inclined face is exposed by the second beam scanning to form a microscopic and steep inclined face.

More specifically, the control circuit (50 of FIG. 1) of this example acquires as the numerical values indicating the desired solid configuration, at least the width (desired width) of the top face 81, the inclination angle (desired inclination angle) of the inclined face 82 and the depth (desired depth) of the bottom face 84, and generates based on the numerical values an engraving signal (a scanning control signal and a laser beam control signal), and performs control so that the initial inclined face 82*d* having an inclination angle smaller than the desired inclination angle acquired is formed and at the same time, the bottom face 84 having the desired depth acquired is formed and thereafter the inclination angle of the initial inclined face 82*d* is enlarged to the desired inclination angle.

A second embodiment according to the presently disclosed subject matter will be described in detail.

Figure 16A:
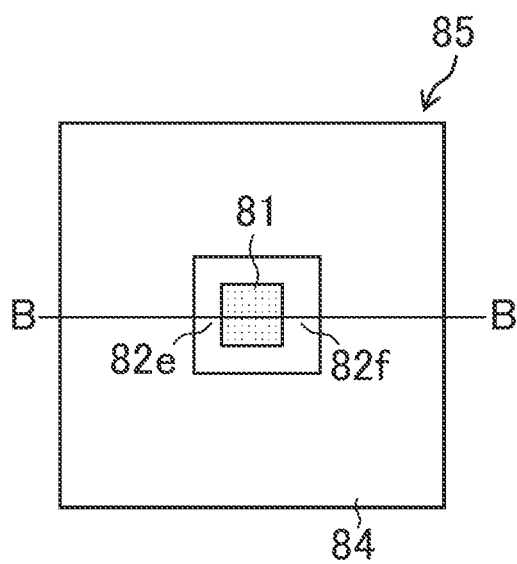
FIG. 16A is a plan view illustrating an exemplary relief pattern having a point-like top face.
Figure 16B:
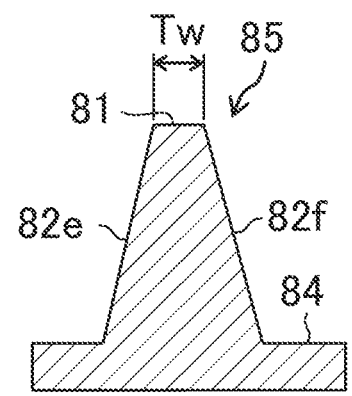
FIG. 16B is a cross-sectional view of the relief pattern along the line B-B of FIG. 16A.

FIG. 16A is a plan view illustrating an exemplary relief pattern 85 having a square point-like top face 81 (halftone dot). FIG. 16B is a cross-sectional view of the relief pattern 85 along the line B-B in a primary scanning direction R of FIG. 16A. The relief pattern 85 of this example has inclined faces 82*e* and 82*f* which incline towards the outside of a top face 81 while having the top face 81 therebetween.

Firstly, a first example of exposure control for forming the relief pattern 85 illustrated in FIGS. 16A and 16B will be described with reference to the explanatory views of FIGS. 17A and 17B.

Figure 17A:
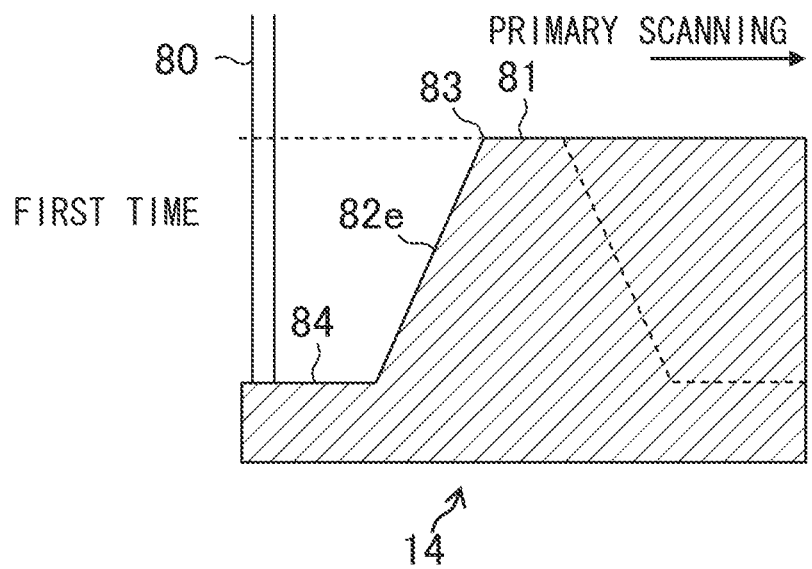
FIGS. 17A and 17B are cross-sectional views for explaining exemplary first exposure control according to a second embodiment.

FIG. 17A illustrates a plate material 14 after a first beam scanning. FIG. 17B illustrates the plate material 14 after a second beam scanning. Here, the beam scanning is performed along the line B-B of FIG. 16A.

In the engraving signal generation (step S108 of FIG. 5), the control circuit 50 of this example determines based on desired solid configuration data whether the width Tw (refer to FIG. 16 B) of the desired top face 81 is smaller than a threshold value or not. In brief, the magnitude of the width of the top face 81 is determined based on the desired solid configuration data, whereby it is determined whether degradation of the top face 81 (particularly, edge) caused by melting when the inclined face 82 is formed by a single beam scanning is permissible or not.

Figure 17B:
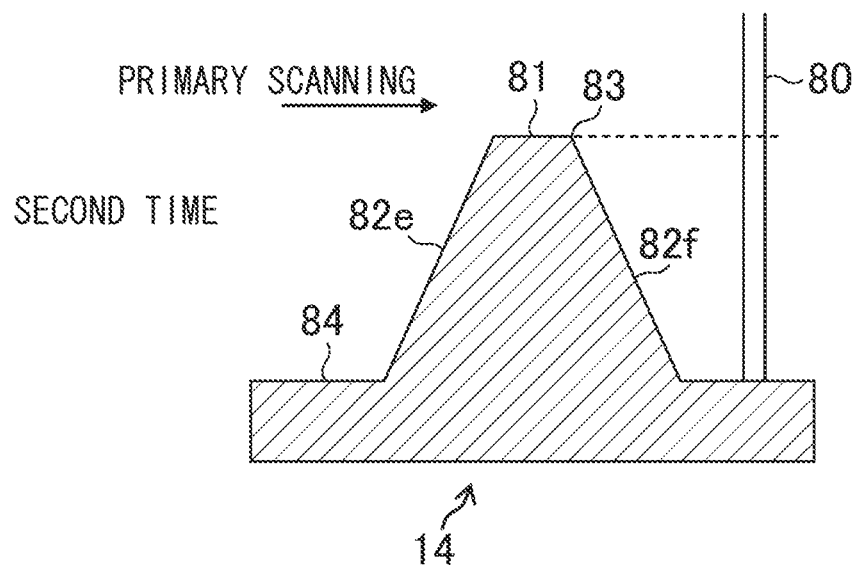

When the width Tw of the desired top face 81 is smaller than the threshold value, the control circuit 50 firstly forms, as illustrated in FIG. 17A, the one inclined face 82*e* by laser beam irradiation by a single beam scanning and subsequently, forms, as illustrated in FIG. 17B, the other inclined face 82*f* by laser beam irradiation by a single beam scanning.

When the width of the desired top face 81 is equal to or greater than the threshold value, the control circuit 50 skips the laser beam control illustrated in FIG. 17A and forms the inclined faces 82*e* and 82*f* by laser beam irradiation by a single beam scanning.

As described above, according to the present embodiment, when the relief pattern 85 is formed which has a width of the top face 81 smaller than the permissible value and the inclined faces 82*e* and 82*f*, on both sides of the top face 81, arranged in close proximity to each other, the formation areas of the two inclined faces 82*e* and 82*f* are not removed by the same beam scanning. More specifically, the control circuit 50 acquires the width of the desired top face 81 and performs switching between the following two operations based on the acquired width of the desired top face 81: that is, an operation of irradiating a laser beam by a single scanning on the formation area of the first inclined face 82*e* to form the inclined face 82*e* and thereafter irradiating the laser beam on the formation area of the second inclined face 82*f* by a single scanning to form the second inclined face 82*f*; and an operation of irradiating the laser beam by a single scanning both on the formation area of the first inclined face 82*e* and on the formation area of the second inclined face 82*f* to form both the first inclined face 82*e* and the second inclined face 82*f*. Accordingly, the inclined faces 82*e* and 82*f* (particularly, edge portion 83) are suppressed from being melted by interaction between heat applied to the one inclined face and heat applied to the other inclined face.

Figure 18C:
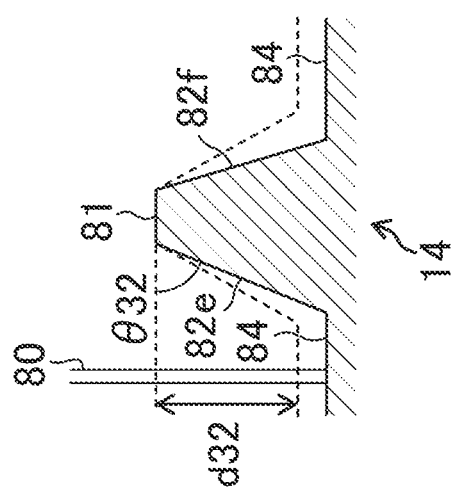
FIGS. 18A to 18C are cross-sectional views for explaining exemplary second exposure control according to the second embodiment.

A second example of exposure control for forming the relief pattern 85 illustrated in FIGS. 16A and 16B will be described with reference to the explanatory views of FIGS. 18A to 18C.

Figure 18B:
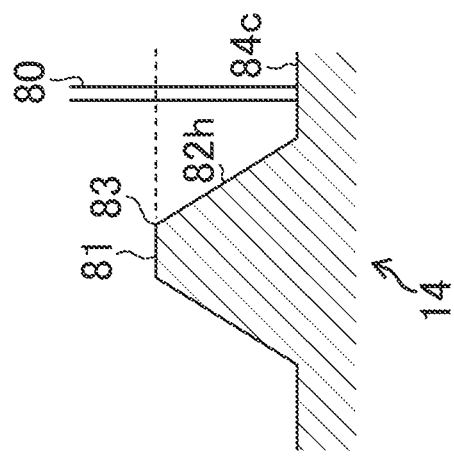
Figure 18A:
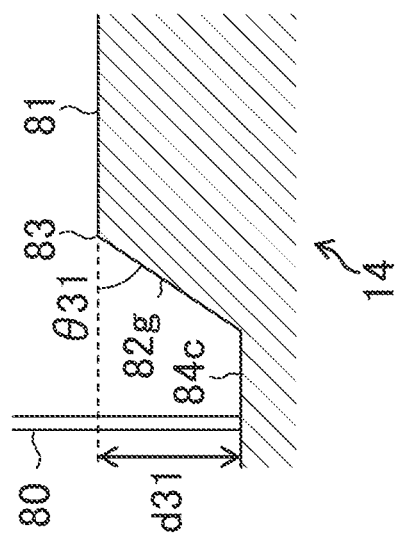

FIG. 18A illustrates the plate material 14 after a first beam scanning. FIG. 18B illustrates the plate material 14 after a second beam scanning. FIG. 18C illustrates the plate material 14 after a third beam scanning. Here, the beam scanning is performed along the line B-B of FIG. 16A. Similarly to the first example of exposure control, the control circuit 50 determines whether the width Tw of the desired top face 81 is smaller than a threshold value or not.

When the width Tw of the desired top face 81 is smaller than the threshold value, the control circuit 50 firstly forms, as illustrated in FIG. 18A, the one initial inclined face 82g by laser beam irradiation by a first beam scanning and subsequently, forms, as illustrated in FIG. 18B, the other initial inclined face 82h by laser beam irradiation by a second beam scanning. The control circuit 50 also forms, as illustrated in FIGS. 18A and 18B, an initial bottom face 84c by laser beam irradiation by the first and second beam scannings. Subsequently, the control circuit 50 enlarges, as illustrated in FIG. 18C, both the inclination angles of the initial inclined faces 82g and 82h to the desired inclination angle by laser beam irradiation by a single beam scanning and at the same time, enlarges the depth of the initial bottom face 84c to the desired depth.

The control circuit 50 of this example acquires the width of the desired top face 81 and performs switching between the following two operations based on the acquired width of the desired top face 81: that is, an operation of irradiating a laser beam on a formation area of the first inclined face 82e by a single beam scanning to form the initial first inclined face 82g and thereafter irradiating the laser beam on a formation area of the second inclined face 82f by a single beam scanning to form the initial second inclined face 82h; and an operation of irradiating the laser beam both on the formation area of the first inclined face 82e and on the formation area of the second inclined face 82f by a single beam scanning to form both the initial first inclined face 82g and the initial second inclined face 82h.

That is, this example corresponds to a case in which the first example of exposure control according to the present embodiment is applied to the first embodiment. In the example illustrated in FIG. 18A to 18C, the bottom face 84 is engraved in two phases, but the aspect of control in the second example of exposure control according to the first embodiment illustrated in FIG. 14 may be applied. More specifically, the control circuit 50 forms the bottom face 84 having the desired depth by the first and second beam scannings, and only steepens the inclined face by the second beam scanning.

A third embodiment according to the presently disclosed subject matter will be described below in detail.

In the first and second embodiments, exposure control in a primary scanning direction has been described. In the present embodiment, exposure control in a secondary scanning direction will be described. Here, the forming of the inclined faces in a primary scanning direction can be performed by the method described in the first embodiment or the second embodiment.

FIG. 19A is a plan view illustrating an exemplary relief pattern 85 having a square point-like top face 81 (halftone dot). FIG. 19B is a cross-sectional view of the relief pattern 85 along the line B-B in a secondary scanning direction S of FIG. 19A. Referring to FIG. 19B, reference numeral 241 designates the surface of the plate material 14 after a first exposure (laser beam); reference numeral 242 designates the surface of the plate material 14 after a second exposure; and reference numeral 243 designates the surface of the plate material 14 after a third exposure.

The control circuit 50 of this example supplies a laser beam control signal to the LD driver circuit 22 and thereby performs, as illustrated by reference numeral 241 of FIG. 19B, the first exposure (laser beam irradiation) for forming an initial inclined face 82i and an initial bottom face 84i. Subsequently, the second exposure is performed which enlarges the inclination angle of the initial inclined face 82i and the depth of the initial bottom face 84i and thereby forms an intermediate inclined face 82j and an intermediate bottom face 84j. Subsequently, the third exposure is performed which enlarges the inclination angle of the intermediate inclined face 82j and the depth of the intermediate bottom face 84j and thereby forms the desired inclined face 82 and the desired bottom face 84.

Figure 20:
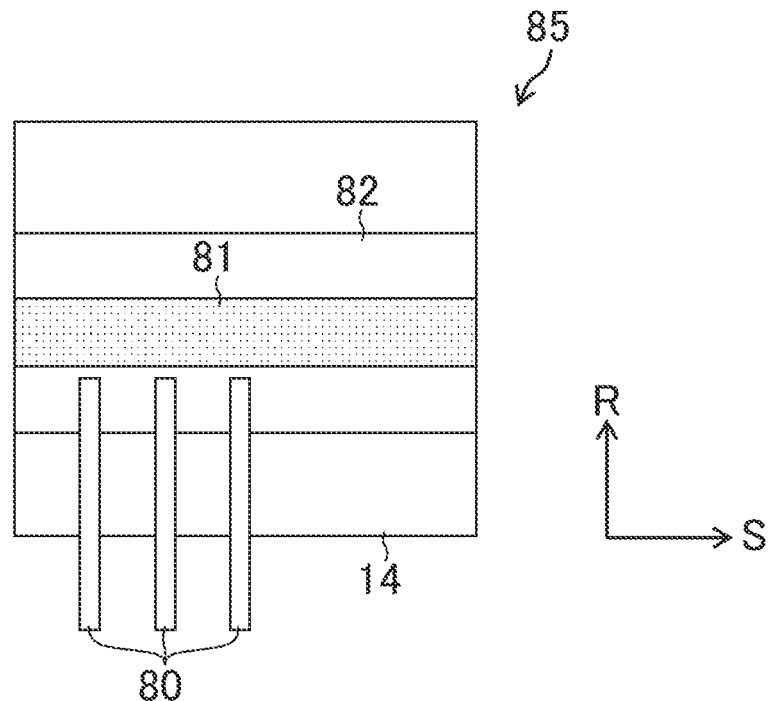
FIG. 20 is a plan view illustrating an exemplary relief pattern having a top face in the shape of a band along a secondary scanning direction.

FIG. 20 is a plan view illustrating another example of relief pattern 85 formed in the plate material 14. The relief pattern 85 of this example includes a top face 81 of a shape of band along the secondary scanning direction S.

Figure 21:
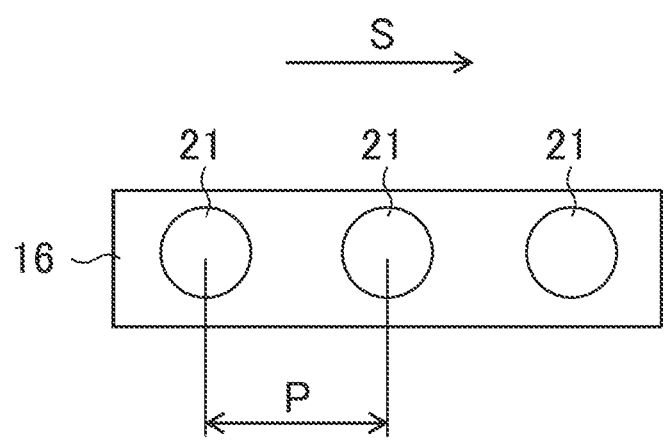
FIG. 21 is a view illustrating an exemplary exposure head having irradiation openings arrayed in a secondary scanning direction.

For example, as the exposure head 16, a multibeam exposure head illustrated in FIG. 21 is used which includes a plurality of irradiation openings 21 arrayed at a pitch P in the secondary scanning direction S. In this way, when a plurality of irradiation openings 21 are arrayed in the secondary scanning direction S so that multiple parts of the plate material 14 in the secondary scanning direction S are simultaneously exposed, productivity can be raised. The pitch P may be set arbitrarily, but a distance is preferably provided between the heads so that the laser irradiation parts of the plate material 14 don't thermally affect each other.

The control circuit 50 of this example performs control (beam number control) of switching the number (1 to 3) of times of simultaneous laser beam irradiation in a secondary scanning direction, and also performs control (beam power control) of switching the magnitude of power of the selected laser beams.

Figure 22:
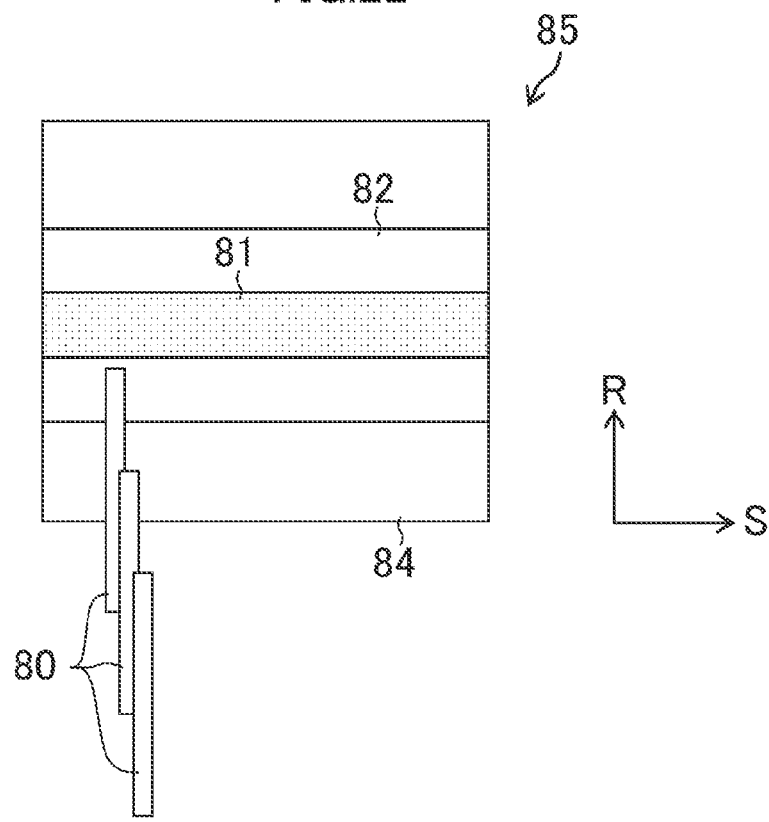
FIG. 22 is a plan view illustrating an exemplary relief pattern having a top face in the shape of a band along a secondary scanning direction and exemplary laser beams arrayed in a primary scanning direction.
Figure 23A:
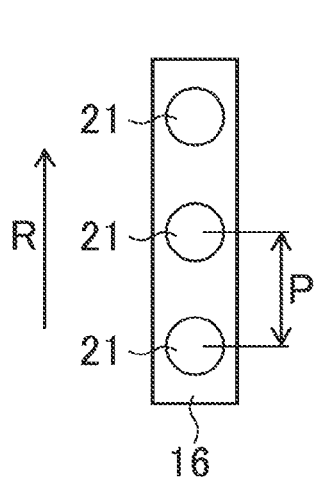
FIG. 23A is a view illustrating an exemplary exposure head having irradiation openings arrayed in a primary scanning direction.

FIG. 22 illustrates the relief pattern 85 similar to one illustrated in FIG. 20. For example, as the exposure head 16, a multibeam exposure head illustrated in FIG. 23A may be used which includes a plurality of irradiation openings 21 arrayed at a pitch P in a primary scanning direction R. In FIG. 22, in order to make multiple laser beams 80 easily viewable, the laser beams 80 are illustrated in a manner slightly displaced in the secondary scanning directions, but are actually arranged on the same line (primary scanning line). In this way, when a plurality of irradiation openings 21 are arrayed in a primary scanning direction R, so that multiple parts of the plate material 14 in the primary scanning direction R are simultaneously exposed, productivity can be raised.

The control circuit 50 of this example performs control (beam number control) of switching the number (1 to 3) of times of simultaneous laser beam irradiation in a primary scanning direction, and also performs control (beam power control) of switching the magnitude of power of the selected laser beams.

Figure 23B:
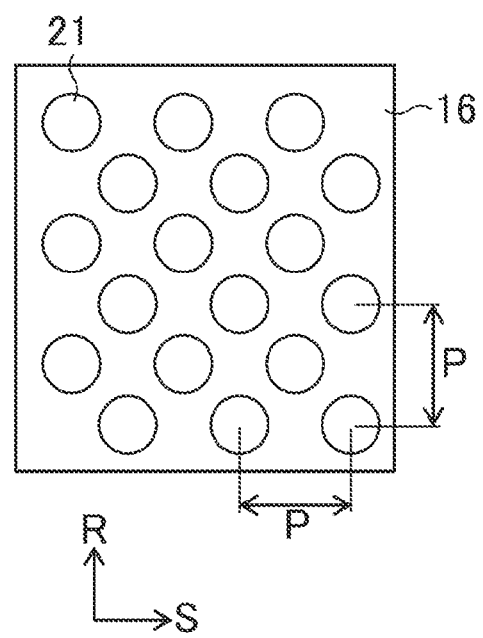
FIG. 23B is a view illustrating an exemplary exposure head having irradiation openings arrayed both in a primary scanning direction and in a secondary scanning direction.

As the exposure head 16, a multibeam exposure head illustrated in FIG. 23B may be used which includes a plurality of irradiation openings 21 arrayed in a zigzag manner at a pitch P both in a primary scanning direction R and in a secondary scanning direction S. In this example, three irradiation openings 21 are arranged both in the primary scanning direction R and in the secondary scanning direction S. The control circuit 50 performs control (beam number control) of switching of the number (1 to 3) of times of simultaneous laser beam irradiation both in a primary scanning direction and in a secondary scanning direction. The control circuit 50 also performs control (beam power control) of switching the magnitude of power of the selected laser beams. The beam number control and the beam power control are performed by the control circuit 50 of FIG. 1. In order to perform the beam number control and the beam power control, the control circuit 50 switches the laser beam control signal supplied to the LD driver circuit 22.

Figure 24:
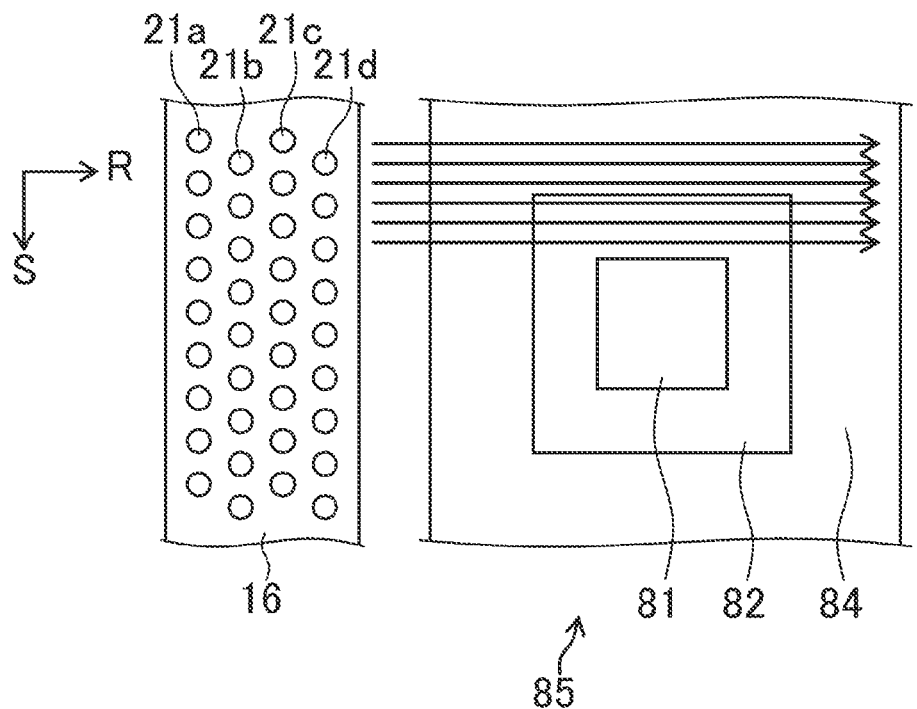
FIG. 24 is a plan view for explaining formation of a relief pattern having a point-like top face by use of an exposure head including irradiation openings arrayed in a zigzag manner.

FIG. 24 schematically illustrates a case in which a relief pattern 85 having a square point-like top face 81 (halftone point) is formed by use of an exposure head 16 including irradiation openings 21 (21*a*, 21*b*, 21*c*, 21*d*) arrayed in a zigzag manner. Here, the laser beam is not irradiated on the formation area of the top face 81. On the formation area of the bottom face 84, the laser beam may be irradiated from a plurality of irradiation openings 21 (for example, 21*a* and 21*c*, or 21*b* and 21*d*) to form a bottom face area on a scanning line by a single beam scanning, and on the formation area of the inclined face 82, the laser beam may be irradiated from a single irradiation opening 21 (for example, 21*a* or 21*b*) to form an inclined face area on a scanning line by multiple beam scannings.

Figure 25:
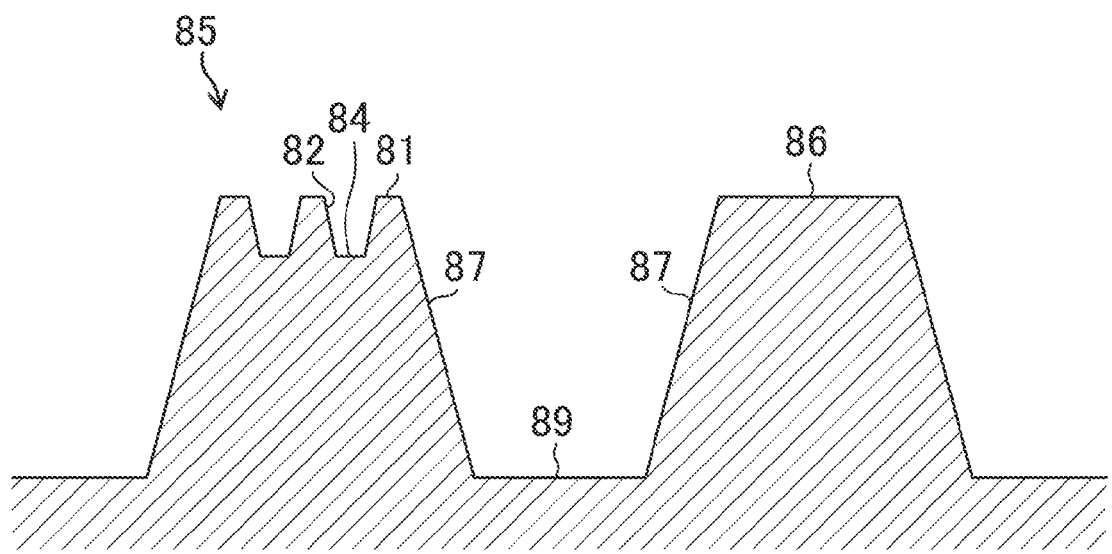
FIG. 25 is a cross-sectional view illustrating an exemplary relief pattern application.
Figure 26A:
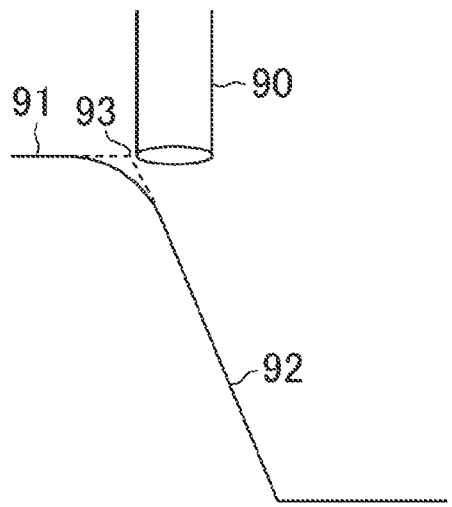
FIGS. 26A and 26B are views for explaining problems of related art.
Figure 26B:
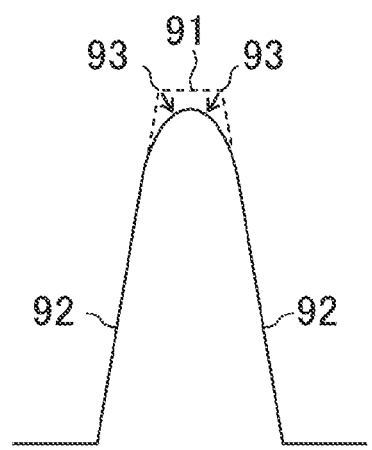
Figure 27A:
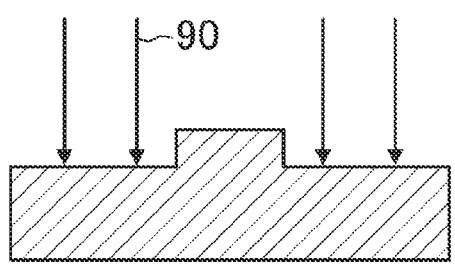
FIGS. 27A and 27B are views for explaining formation of a staircase-shaped relief pattern according to related art.
Figure 27B:
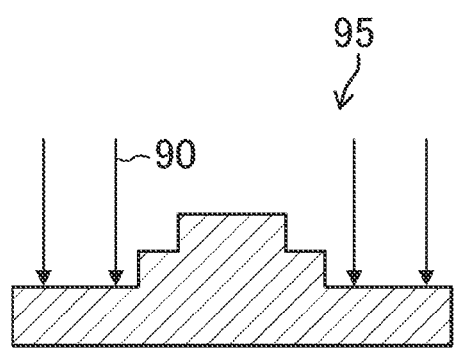

The above description is about a relief pattern including a point-like top face illustrated in FIGS. 19A and 19B and one including a band-like top face illustrated in FIG. 12; but the relief pattern is particularly not limited to these examples. The desired shape, size and number of the top face, inclined face, bottom face and the like may be set arbitrarily. For example, a relief pattern 85 illustrated in FIG. 25 may be formed which includes top faces 81 and 86 different in size, inclined faces 82 and 87 different in size, and bottom faces 84 and 89 different in size.

The above description has been given by taking a printing plate as an example of relief, but the relief is particularly not limited to this example. Needless to say, the presently disclosed subject matter may be applied to a case in which another type of relief is manufactured. For example, the presently disclosed subject matter may be applied to manufacturing of various types of reliefs such as a film having a concave and convex shape, a semiconductor device and a display device.

The above description has been given by taking semiconductor laser as an example of laser, but the type of laser is particularly not limited to this example, but the presently disclosed subject matter may be applied to a case in which another type of laser is used.

The presently disclosed subject matter is not limited to the examples described in this specification and to the examples illustrated in the drawings. Of course, various design modifications and improvements to the examples are possible without departing from the gist of the invention.

What is claimed is:

1. A relief manufacturing apparatus capable of engraving an engraving material using a laser beam and thereby manufacturing a relief having a top face and an inclined face, the relief manufacturing apparatus comprising:
    a laser beam irradiating device configured to irradiate the laser beam on the engraving material;
    a scanning device configured to move at least one of the engraving material and the laser beam irradiating device and thereby to cause the laser beam irradiating device to scan the engraving material;
    a numerical value acquiring device configured to acquire a numerical value indicating a solid configuration of the relief, the numerical value including a first inclination angle indicating the inclination of the inclined face of the relief;
    a control device configured to control the scanning device and the laser beam irradiating device so that the laser beam is irradiated on a surface of the engraving material to form an initial inclined face having a second inclination angle smaller than the first inclination angle acquired by the numerical value acquiring device and thereafter the laser beam is irradiated on the initial inclined face to enlarge the inclination of the inclined face from the second inclination angle to the first inclination angle.

2. The relief manufacturing apparatus according to claim 1, wherein when a first inclined face and a second inclined face are formed which incline towards the outside of the top face while having the top face therebetween, the numerical value acquiring device acquires a width of the top face of the relief, and the control device performs switching between the following two operations based on the width acquired by the numerical value acquiring device: that is, an operation of irradiating the laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

3. The relief manufacturing apparatus according to claim 2, wherein the control device irradiates the laser beam by a single scanning on both the first initial inclined face and the second initial inclined face and thereby enlarges the inclination of the first initial inclined face and the inclination of the second initial inclined face from the second inclination angle to the first inclination angle.

4. The relief manufacturing apparatus according to claim 1, wherein the numerical value acquiring device acquires a first depth corresponding to a bottom face between the inclined faces of the relief, and
    wherein the control device forms the initial inclined faces and at the same time, forms an initial bottom face of a second depth smaller than the first depth between the initial inclined faces, and thereafter enlarges the inclination of the initial inclined faces from the second inclination angle to the first inclination angle and at the same time, enlarges the depth of the initial bottom face from the second depth to the first depth.

5. The relief manufacturing apparatus according to claim 1, wherein the numerical value acquiring device acquires a depth of the bottom face between the inclined faces of the relief, and
    wherein the control device forms the initial inclined faces and at the same time, forms the bottom face of the depth between the initial inclined faces, and thereafter enlarges the inclination of the initial inclined faces from the second inclination angle to the first inclination angle.

6. A relief manufacturing apparatus capable of engraving an engraving material using a laser beam and thereby manufacturing a relief having a top face and an inclined face, the relief manufacturing apparatus comprising:
    a laser beam irradiating device configured to irradiate the laser beam on the engraving material;
    a scanning device configured to move at least one of the engraving material and the laser beam irradiating device and thereby to cause the laser beam irradiating device to scan the engraving material;
    a numerical value acquiring device configured to acquire a numerical value indicating a solid configuration of the relief, the numerical value including a width of the top face of the relief; and
    a control device configured to control the scanning device and the laser beam irradiating device, wherein when a first inclined face and a second inclined face are formed which incline towards the outside of the top face while having the top face therebetween, the control device performs switching between the following two operations based on the width of the top face acquired by the numerical value acquiring device: that is, an operation of irradiating the laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

7. The relief manufacturing apparatus according to claim 1, wherein the laser beam irradiating device includes a plurality of laser beam irradiation openings arrayed in a scanning direction, and
wherein the control device switches the number of times of simultaneous laser beam irradiation on the same scanning line.

8. The relief manufacturing apparatus according to claim 1, wherein the laser beam irradiating device includes a plurality of laser beam irradiation openings arrayed in a first scanning direction and in a second scanning direction orthogonal to the first scanning direction, and
wherein the control device switches the number of times of simultaneous laser beam irradiation on the same scanning line both in the first scanning direction and in the second scanning direction.

9. The relief manufacturing apparatus according to claim 7, wherein the control device controls to switch the number of times of simultaneous laser beam irradiation on the same scanning line, and also controls to switch the magnitude of power of the simultaneously irradiated laser beams.

10. A relief manufacturing method for engraving an engraving material using a laser beam irradiated by a laser beam irradiating device and scanning device to form a relief having a top face and an inclined face, the relief manufacturing method comprising:
a numerical value acquiring step of acquiring a first inclination angle indicating the inclination of the inclined face of the relief to be manufactured using a numerical value acquiring device;
an inclined face forming step of forming an initial inclined face by irradiating the laser beam on a surface of the engraving material and scanning the laser beam using the scanning device, said scanning device moving at least one of the laser beam irradiating device and the engraving material relative to one another, to form the initial inclined face having a second inclination angle smaller than the first inclination angle; and
an inclined face steepening step of irradiating the laser beam on the initial inclined face using the laser beam irradiating device and the scanning device and thereby enlarging the inclination of the inclined face from the second inclination angle to the first inclination angle.

11. The relief manufacturing method according to claim 10, wherein when a first inclined face and a second inclined face are formed which incline towards the outside of the top face while having the top face therebetween:
in the numerical value acquiring step, a width of the top face of the relief is acquired; and
in the inclined face forming step, switching is performed based on the width acquired in the numerical value acquiring step between the following two operations: that is, an operation of irradiating the laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and an operation of irradiating the laser beam by a single scanning both on the area where the first inclined face is to be formed and on the area where the second inclined face is to be formed, so that both the first initial inclined face and the second initial inclined face are formed.

12. The relief manufacturing method according to claim 11, wherein in the inclined face steepening step, the laser beam is irradiated by a single scanning both on the first initial inclined face and the second initial inclined face to enlarge the inclination of both the first initial inclined face and the second initial inclined face from the second inclination angle to the first inclination angle.

13. The relief manufacturing method according to claim 10, wherein
in the numerical value acquiring step, a first depth corresponding to a bottom face between the inclined faces of the relief is acquired, and
in the inclined face forming step, the initial inclined face is formed and at the same time, an initial bottom face of a second depth smaller than the first depth is formed between the initial inclined faces and thereafter,
in the inclined face steepening step, the inclination of the initial inclined face is enlarged from the second inclination angle to the first inclination angle and at the same time, the depth of the initial bottom face is enlarged from the second depth to the first depth.

14. The relief manufacturing method according to claim 10, wherein
in the numerical value acquiring step, a depth of the bottom face between the inclined faces of the relief is acquired, and
in the inclined face forming step, the initial inclined face is formed and at the same time, a bottom face of the depth is formed between the initial inclined faces and thereafter,
in the inclined face steepening step, the inclination of the initial inclined face is enlarged from the second inclination angle to the first inclination angle.

15. A relief manufacturing method for engraving an engraving material using a laser beam irradiated by a laser beam irradiating device and scanning device to form a relief having a top face and having a first inclined face and a second inclined face inclining towards the outside of the top face while having the top face therebetween, the relief manufacturing method comprising:
a numerical value acquiring step of acquiring a width of the top face of the relief using a numerical value acquiring device;
determining which one of the following two operations a) and b) to perform based on the acquired width: wherein operation a) comprises irradiating the laser beam by a single scanning on an area where the first inclined face is to be formed, so that a first initial inclined face is formed, and thereafter irradiating the laser beam by a single scanning on an area where the second inclined face is to be formed, so that a second initial inclined face is formed; and wherein operation b) comprises irradiating the laser beam by a single scanning both on the area where the first inclined face is to be formed and on the area where the second inclined face is to be formed, so that both the first initial inclined face and the second initial inclined face are formed; and engraving the engraving material based on the determination result of the determination step by use of the laser beam and the scanning device using one of operation a) and operation b, wherein in operations a) and b), scanning comprises moving at least one of the laser beam irradiating device and the engraving material relative to one another.

16. The relief manufacturing method according to claim 10, wherein the laser beam irradiating device includes a plurality of laser beam irradiation openings arrayed in a scanning direction, and the number of times of simultaneous laser beam irradiation on the same scanning line is switched.

17. The relief manufacturing method according to claim 10, wherein the laser beam irradiating device includes a plurality of laser beam irradiation openings arrayed in a first scanning direction and in a second scanning direction orthogonal to the first scanning direction, and the number of times of simultaneous laser beam irradiation on the same scanning line both in the first scanning direction and in the second scanning direction is switched.

18. The relief manufacturing method according to claim 16, wherein control is performed so that the number of simultaneous times of laser beam irradiation on the same scanning line is switched, and the magnitude of power of the simultaneously irradiated laser beams is switched.

* * * * *